US009218477B2

(12) United States Patent
Lewis et al.

(10) Patent No.: US 9,218,477 B2
(45) Date of Patent: *Dec. 22, 2015

(54) ELECTRONIC PHYSICAL UNCLONABLE FUNCTIONS

(71) Applicant: Lewis Innovative Technologies, Inc., Decatur, AL (US)

(72) Inventors: James M Lewis, Moulton, AL (US); Dane R Walther, Madison, AL (US); Paul H Horn, Huntsville, AL (US)

(73) Assignee: LEWIS INNOVATIVE TECHNOLOGIES, Decatur, AL (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/863,150

(22) Filed: Apr. 15, 2013

(65) Prior Publication Data

US 2013/0276151 A1    Oct. 17, 2013

Related U.S. Application Data

(60) Provisional application No. 61/624,023, filed on Apr. 13, 2012.

(51) Int. Cl.
| | |
|---|---|
| *G06F 21/44* | (2013.01) |
| *G06F 21/70* | (2013.01) |
| *G06F 21/73* | (2013.01) |
| *G09C 1/00* | (2006.01) |
| *H04L 9/08* | (2006.01) |

(52) U.S. Cl.
CPC ............... *G06F 21/44* (2013.01); *G06F 21/70* (2013.01); *G06F 21/73* (2013.01); *G09C 1/00* (2013.01); *H04L 9/0866* (2013.01); *H04L 2209/12* (2013.01)

(58) Field of Classification Search
CPC ....................................................... G06F 21/70
USPC ....................................... 713/185; 726/26, 34
See application file for complete search history.

(56) References Cited

U.S. PATENT DOCUMENTS

| | | | |
|---|---|---|---|
| 5,471,194 A | 11/1995 | Guscott | |
| 6,943,518 B1 | 9/2005 | Mooney | |
| 7,328,115 B2 | 2/2008 | Shipton et al. | |
| 7,380,131 B1 * | 5/2008 | Trimberger | ................ 713/193 |
| 7,757,083 B2 | 7/2010 | Devadas et al. | |

(Continued)

OTHER PUBLICATIONS

Costea, Crina, et al. "Analysis and enhancement of ring oscillators based physical unclonable functions in FPGAs." Reconfigurable Computing and FPGAs (ReConFig), 2010 International Conference on. IEEE, 2010.*

(Continued)

*Primary Examiner* — Yin-Chen Shaw
*Assistant Examiner* — Michael Guirguis
(74) *Attorney, Agent, or Firm* — Welsh Flaxman & Gitler LLC

(57) ABSTRACT

An electronic asymmetric unclonable function applied to an electronic system being evaluated includes an electronic system and an AUF array electronically associated with the electronic system. The AUF array includes a plurality of non-identical cells. Each of the non-identical cells includes a test element representing a characteristic of the electronic system being evaluated and a measurement device evaluating the test element. A comparison unit processes an output of the measurement device to provide a multi-bit output value representing a magnitude of differences.

1 Claim, 20 Drawing Sheets

Asymmetric Array using Ring Oscillators as Characteristic Elements and binary counters as measurement devices.

(56) References Cited

U.S. PATENT DOCUMENTS

| | | | | |
|---|---|---|---|---|
| 2003/0204743 | A1* | 10/2003 | Devadas et al. | 713/200 |
| 2005/0151777 | A1 | 7/2005 | Silverbrook | |
| 2007/0250938 | A1* | 10/2007 | Suh et al. | 726/34 |
| 2009/0010107 | A1 | 1/2009 | Drude | |
| 2010/0031065 | A1 | 2/2010 | Futa et al. | |
| 2011/0040817 | A1 | 2/2011 | Lazich et al. | |
| 2012/0033810 | A1 | 2/2012 | Devadas et al. | |
| 2012/0319724 | A1* | 12/2012 | Plusquellic et al. | 326/8 |

OTHER PUBLICATIONS

Kirkpatrick, Michael S., Elisa Bertino, and Sam Kerr. "PUF ROKs: generating read-once keys from physically unclonable functions." Proceedings of the Sixth Annual Workshop on Cyber Security and Information Intelligence Research. ACM, 2010.*

Maiti, Abhranil, et al. "A large scale characterization of RO-PUF." Hardware-Oriented Security and Trust (HOST), 2010 IEEE International Symposium on. IEEE, 2010.*

Vivekraja, Vignesh, and Leyla Nazhandali. "Circuit-level techniques for reliable physically uncloneable functions." Hardware-Oriented Security and Trust, 2009. HOST'09. IEEE International Workshop on. IEEE, 2009.*

Xin, Xin, Jens-Peter Kaps, and Kris Gaj. "A configurable ring-oscillator-based PUF for xilinx FPGAs." Digital System Design (DSD), 2011 14th Euromicro Conference on. IEEE, 2011.*

Devadas, Srini. "Physical Unclonable Functions (PUFs) and Secure Processors" Workshop on Cryptographic Hardware and Embedded Systems 2009 (CHES 2009).*

Suh, G. Edward, and Srinivas Devadas. "Physical unclonable functions for device authentication and secret key generation." Proceedings of the 44th annual Design Automation Conference. ACM, 2007.*

Morozov, Sergey, Abhranil Maiti, and Patrick Schaumont. "An analysis of delay based PUF implementations on FPGA." Reconfigurable Computing: Architectures, Tools and Applications. Springer Berlin Heidelberg, 2010. 382-387.*

* cited by examiner

Figure 1, PUF Challenge/Response Concept

Figure 2, Conventional PUF Elements or Cells, Specifically an Arbiter PUF

Figure 3, Comparison of Arbitrary Rectangles

Figure 4, General Case Asymmetric Unclonable Function

Figure 5. Basic Oscillator

Figure 6, Ring Oscillator Array

Figure 7. Asymmetric Array using Ring Oscillators as Characteristic Elements and binary counters as measurement devices.

Figure 8, Asymmetric Array with Reference Cell

Figure 9, Reference Cell

Figure 10, Asymmetric Ring Oscillators with Multiplexed rout Lengths

Figure 11, Asymmetric Unclonable Function Structure

Figure 12, Comparison of Symmetric Ring Oscillator PUF Elements and Ring Oscillator AUF Elements Figure 13, AUF Element incorporating PCB traces and multiple integrated circuits.

Figure 14, Diode Incorporated AUF cells

Figure 15. Multiplier Based AUF Cell

Figure 16, Asymmetric Unclonable Array Constructed of Multiplier-Based Cells/Elements Figure 17, Memory Based AUF Cell Figure 18, Asymmetric Unclonable Array Constructed of Memory Delay Based Cells/Elements

ELECTRONIC PHYSICAL UNCLONABLE FUNCTIONS

CROSS REFERENCE TO RELATED APPLICATION

This application claims the benefit of U.S. Provisional Application Ser. No. 61/624,023, entitled "ELECTRONIC PHYSICAL UNCLONABLE FUNCTIONS," filed Apr. 13, 2012.

BACKGROUND OF THE INVENTION

1. Field of the Invention

This invention relates to technologies for authentication of electronic devices and systems. Specifically, this invention deals with electronic Physical Unclonable Function (PUF) technology.

2. Description of the Related Art

A Physical Unclonable Function (PUF) is a device or structure (physical, electronic, chemical, etc) that is easily implemented but difficult to counterfeit. A PUF could be an ink smear that is well documented and difficult to replicate. Some PUFs are implemented as drops of clear lacquer with multi-color glitter embedded (see Tuyls, Schrijenm, Geloven, Verhaegn, Wolters. "Read-Proof Hardware from Protective Coatings." *Cryptographic Hardware and Embedded Systems—CHES 2006*, volume 4249 of *Lecture Notes in Computer Science*, pages 369-383. Springer, Oct. 10-13, 2006.). The glittered lacquer is easy to apply but it is obviously difficult to replicate any specific glitter pattern that is created.

In electronic systems a Physical Unclonable Function provides a secure method of deriving a unique code from electronic devices without embedding any memory cells or registers that can be counterfeited. PUF systems also provide a large number of challenge/response sets to make "guessing" the appropriate response difficult and impractical.

As shown in FIG. 1, the PUF system accepts a challenge variable of n-bits length and provides a response of m-bits length. The ideal Challenge/Response system uses large n and m and every response is a unique function of the challenge and the unique manufacturing variation of the integrated circuit. In classic symmetrical PUF systems (such as the example illustrated in FIG. 2), each bit of the response is produced from a separate test from all the other bits. The arbiter PUF elements shown in FIG. 2 produce a single bit result from the comparison of delay between the two arbitrated paths (the paths are arbitrated based on the challenge bits). In order to produce more output or response bits, more identical elements are composed. Based on the challenge, each test produces only one bit.

Those skilled in the art will appreciate that there are a few important terms that should be understood and defined when discussing PUF technology. These are Entropy, Stability, and Variance. These terms will be capitalized when used in this document to indicate that we are referring to the PUF characteristics.

Stability

First, the same challenge, applied to the same integrated circuit does not always result in the same response. In Symmetrical PUFs, a typical 128-bit challenge will produce a 128-bit response with 5-10 bits of difference resulting from each inquiry (not always the same bits changing, either). These 5-10 bits of uncertainty can be referred to as noise. Stability refers to the number of bits that remain constant when the same challenge is applied to the same PUF structure within the same integrated circuit. The inverse of the noise is the relative "Stability" of the PUF system.

Entropy

The second problem is "stuck bits." Entropy describes the number of bits that change between differing challenges or between the same challenge on different integrated circuits. Bits that do not change are referred to as stuck bits. In many PUF systems, there are response bits that never change. These bits are really useless in determining the uniqueness or authenticity of a device. The percentage of bits that can be relied on (that change from challenge to challenge and from device to device) is referred to as Entropy. In other words, a 100-bit PUF response with 5 stuck bits has 95% Entropy.

Further, some bits may tend toward one value. That is, a bit may be a logical "1" 80% of the time. Although that bit is not "stuck" it does not exhibit perfect entropy (which would be a logical "1" 50% of the time and a logical "0" 50% of the time). A bit that exhibits one output 50% of the time has 100% bit-wise entropy. The bit described as having one value 20% of the time has a bit wise entropy of 40%.

Variation

Variation describes the difference in response between different integrated circuits when the same challenge is used. Cryptographically, 50% Variation is ideal. That is, when the same PUF system is implemented in two identical integrated circuits and the same challenge response is issued to each integrated circuit, half of the bits should be different between the two responses. For large digit numbers (say 128-bit or 256-bit numbers) there are a large number of terms that are 50% different from any given term. For example, there are $3.4 \times 10^{38}$ possible numeric values for 128-bit binary numbers. For any given 128-bit binary number, v, there are $2.4 \times 10^{27}$ other 128-bit binary numbers that exhibit a 50% variation from any given 128-bit value.

Challenge and Response

PUFs may be created to have multiple challenge-response pairs, whereby a challenge that sets a particular configuration controls the PUF's general behavior and the response is a quantifiable result of the PUF's specific behavior. An example analogy to this challenge-response pair may be giving someone a map with a marked path that they are to take from point A to point B, and the response would be the set of information describing the actual trip they took, such as how long they traveled, which side of the street they walked on, whether or not they stopped into a store along the way, etc. Two people given the same map (challenge) will inevitably have at least minor differences in their specific responses due to their own unique differences.

Programmable Logic Devices

Programmable Logic Devices (PLD) are integrated circuits that include memory, logic, and specialized functions that can be configured based on a specific configuration file. In this way, one designer may use a PLD to implement a microprocessor while another designer uses the same PLD component to implement a control system based on a complex state machine and yet another designer may implement an arithmetic unit, an image processing engine, a motor controller, or practically an infinite number of unique designs. Field Programmable Gate Arrays (FPGA) and Complex Programmable Logic Devices (CPLD) are the most common types of PLD currently in use. This application will refer to all of these types of devices as PLDs since the structures described may be implemented in any PLD with sufficient available resources.

In electronic systems, Physical Unclonable Functions have been developed based on the idea of creating circuits that are practically identical and comparing the output of these identical functions. Such functions are designed to be highly symmetrical, or equivalent. Theoretically, the only difference between the functions will be due to small differences caused by manufacturing tolerances. Since these minute differences are unique to every piece of silicon manufactured, the resulting system of nearly identical circuits will produce different results in every implementation. Symmetric PUF systems compare a large number of the identical structures. Each comparison results in a single bit binary response based on which structure or which electrical path was the fastest; that is, the response merely determines that a difference does in fact exist. Multiple instantiations are implemented in a design or configuration. The configuration is then applied to multiple integrated circuits so that a response difference from integrated circuit to integrated circuit is solely due to manufacturing differences, and the fact of such difference may be identified. By implementing a large number of supposedly identical instantiations, the resulting system allows any specific set or combinations of structures to be compared.

There are at least three problems associated with this approach. First, experimental data shows that some implementations do not yield a random response for each comparison of identical structures as would be expected. This is the Entropy problem. Comparing some of the instantiations (implemented in multiple integrated circuits) always yields the same response. As discussed above, these non-random responses may be referred to as "stuck bits". If a 100 bit response contains 10 stuck bits, the response is said to have an Entropy (or a useful Entropy) of 90% (or 90 bits, in this case). For the purposes of authentication and cryptography, the strength of the PUF is only as good as the Entropy. The presence of stuck bits implies that the supposed identical structures are not all identical. For a PUF to be effective and useful in cryptographic and authentication applications, the Entropy must be high. A large number of significant bits are required.

Second, the single bit responses are not stable within a single integrated circuit. That is, when a number of structures are tested with multiple comparisons (that is the same test performed over and over on a single integrated circuit) some of the result bits change. These results are sometimes referred to as "noisy bits". The effect may be referred to as response noise or as instability. The applicability of a PUF system for authentication and cryptographic uses is limited by this instability. For a PUF to be effective and useful, it must exhibit high Stability and highly stable responses.

Third, a single bit response provides only very limited information. There are no clues in the stuck bits detailing how badly the structures are mismatched; only that one structure is consistently slower than the other. There is also no information about the noisy bits that could be used to implement a correction.

Classical (Symmetrical) PUF Structures

The basic concept of PUF has been implemented in electronic devices (primarily Programmable Logic Devices, PLD) by comparing two seemingly identical circuits. Typically, the result of this comparison is generated by determining which (of the two identical circuits or paths) is faster. FIG. 2 shows a simplified version of the "Arbiter" PUF. In the arbiter PUF, each set of multiplexers creates a cell. The multiplexers are assumed to be identical and each cell is assumed to be identical to all other cells. A number of cells (typically 64 or 128) are combined to create a PUF Structure (the entire system illustrated in FIG. 2 represents a PUF Structure. In a typical PUF implementation, a number of supposedly identical PUF structures are implemented.

The PUF element shown in FIG. 2 measures the delay between the two paths specified by the challenge. The result only indicates that one path is longer than the other. This type of output is typical of many PUF designs and presents a number of challenges.

Identical Circuits

In the classic electronic PUFs, the first challenge is to make all test circuits as identical as possible so the test results are a function of the challenge and the manufacturing tolerance. As shown in FIG. 2, the arbiter PUF relies on differences in the routing paths through the multiplexers to determine the result. In order to create circuits that are as closely identical as possible a great deal of manual processes are required because the automated design tools are intended to optimize the circuits for speed and resource utilization, not for accuracy in producing identical cells or identical routing paths.

Additionally, modern PLDs are designed for optimized synchronous operation. That is, processes that utilize flip flops and registers clocked (or latched) by a common clock signal. PUFs are typically asynchronous circuits and the PLD structure is not designed to implement accurately identical asynchronous circuits. In fact, because of the layout of the PLD, routing resources in some areas of the chip are different from routing resources in other areas. These differences make it impossible to use these resources to implement structures identical to those implemented in other parts of the chip. (Reference: A. Maiti and P. Schaumont, "Improved RO PUF: An FPGA Friendly Secure Primitive", Journal of Cryptography, 14 Oct. 2010).

A number of examples exist in previous art for using ring oscillators to detect Trojans, for authentication, and to produce unique integrated circuit fingerprints including: Devadas (U.S. Pat. No. 7,757,083), Trimberger (U.S. Pat. No. 7,941,673), and Jyothi (U.S. Patent Application Publication No. 2012/0278893). All of these are limited in areas that provide for effective correction of environmental effects. Ring oscillators are affected by the temperature of the silicon, the power supply voltage (Vcc), and the relative aging of the silicon. Systems that use a single bit result have no mathematical basis or tool for correcting the operation of the ring oscillator based on these environmental effects. Other patents completely ignore the fact that the ring oscillator frequency is affected by temperature, voltage, silicon age, and possibly other influences.

The Asymmetric Unclonable Function (AUF) of the present invention described herein addresses all of these problems.

SUMMARY OF THE INVENTION

It is, therefore, an object of the present invention to provide an electronic asymmetric unclonable function applied to an electronic system being evaluated including an electronic system and an AUF array electronically associated with the electronic system. The AUF array includes a plurality of non-identical cells. Each of the non-identical cells includes a test element representing a characteristic of the electronic system being evaluated and a measurement device evaluating the test element. A comparison unit processes an output of the measurement device to provide a multi-bit output value representing a magnitude of differences.

It is also an object of the present invention to provide an electronic asymmetric unclonable function applied to an electronic system being evaluated wherein the measurement device is a binary counter.

It is another object of the present invention to provide an electronic asymmetric unclonable function applied to an electronic system being evaluated wherein the test elements of the non-identical cells are oscillators.

It is a further object of the present invention to provide an electronic asymmetric unclonable function applied to an electronic system being evaluated wherein each of the non-identical cells includes a measurement device including a binary counter, and the binary counters of the non-identical cells share an enable signal allowing the binary counters to evaluate the operation of the respective oscillators over a specific period of time.

It is also an object of the present invention to provide an electronic asymmetric unclonable function applied to an electronic system being evaluated wherein the oscillators are ring oscillators.

It is another object of the present invention to provide an electronic asymmetric unclonable function applied to an electronic system being evaluated wherein a time interval over which the measurement device evaluates operation of the test element is adjusted based on temperature, voltage, age or other influences.

It is a further object of the present invention to provide an electronic asymmetric unclonable function applied to an electronic system being evaluated wherein the time interval over which the measurement device evaluates operation of the test element is adjusted based on environmental compensation.

It is also an object of the present invention to provide an electronic asymmetric unclonable function applied to an electronic system being evaluated wherein the non-identical cells include at least one reference cell and a plurality of evaluation cells.

It is another object of the present invention to provide an electronic asymmetric unclonable function applied to an electronic system being evaluated wherein the at least one reference cell determines the time interval.

It is a further object of the present invention to provide an electronic asymmetric unclonable function applied to an electronic system being evaluated wherein the reference cell includes a comparator and a signal generating device.

It is also an object of the present invention to provide an electronic asymmetric unclonable function applied to an electronic system being evaluated wherein the time interval over which the measurement device evaluates operation of the test element is adjusted based on scaling such that one evaluation output values is subtracted from another evaluation output value to scale data.

It is another object of the present invention to provide an electronic asymmetric unclonable function applied to an electronic system being evaluated wherein the test element of the non-identical cells includes an arithmetic function.

It is a further object of the present invention to provide an electronic asymmetric unclonable function applied to an electronic system being evaluated wherein the test element of the non-identical cells includes a memory device.

It is also an object of the present invention to provide an electronic asymmetric unclonable function applied to an electronic system being evaluated wherein the test element of the non-identical cells includes a diode.

It is another object of the present invention to provide an electronic asymmetric unclonable function applied to an electronic system being evaluated wherein the test element of the non-identical cells includes a separate integrated circuit.

It is a further object of the present invention to provide an electronic asymmetric unclonable function applied to an electronic system being evaluated wherein the test element of the non-identical cells includes an amplifier.

It is also an object of the present invention to provide an electronic asymmetric unclonable function applied to an electronic system being evaluated wherein the test element of the non-identical cells includes optical or physical devices.

It is another object of the present invention to provide an electronic asymmetric unclonable function applied to an electronic system being evaluated wherein the measurement device includes a volt meter or voltage measuring device.

It is a further object of the present invention to provide an electronic asymmetric unclonable function applied to an electronic system being evaluated wherein the measurement device includes a current measuring meter or device.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
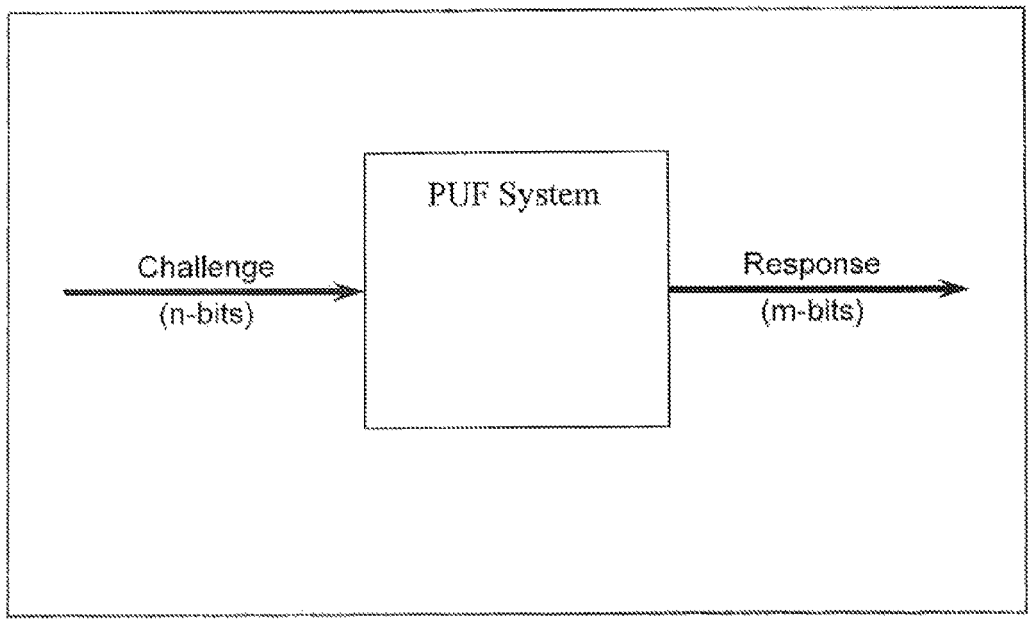
FIG. 1 is a schematic showing the PUF challenge/response concept.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present invention relates to technologies for authentication of electronic devices and systems. More particularly, the invention relates to an electronic asymmetric unclonable function (AUF) applied to an electronic system, for example, an integrated circuit, being evaluated. It includes a programmable logic device having a plurality of non-identical cells. Each of the non-identical cells includes a test element representing a characteristic of the electronic system being evaluated and a measurement device evaluating the test element. A comparison unit processes an output of the measurement device to provide a multi-bit output value representing a magnitude of differences.

As will be appreciated based upon the following disclosure, all measurements, whether voltage, current, mass, frequency, and/or delay, are produced by multi-bit devices such as 12-bit or 16-bit Analog to Digital converters or the binary counters described in this application. The binary counters described herein are typically 12-bit to 16 bit counters (although the use of other bit widths is appreciated). The primary point is that a measurement is made with multi-bit accuracy and the measurements are compared with some mathematical function (typically subtraction, but other functions may be employed) that produces a multi-bit result. The multi-bit result is important for determining the magnitude of differences between devices employing the electronic systems and for determining similarities between devices employing the electronic systems. The power of the present invention lies in the ability to demonstrate similarities between devices as well as differences between the devices.

Specifically, the present invention deals with electronic Physical Unclonable Function (PUF) technology. Considering the shortcomings associated with prior attempts to apply PUF technology, the present invention applies the inventive PUFs, for which we have coined the term Asymmetric Unclonable Function (AUF), to provide a multi-bit vector (or scalar value) for every comparison (wherein each comparison results in a multi-bit result); that is, detailed information on how much difference exists between the compared structures (or elements) of the AUF is achieved. As such, the coined term AUF is used to reference the inventive PUF throughout the body of the present application. (In contrast to the provisional application upon which this application claims priority, the word "Physical" has been dropped because devices employing the present AUF in firmware and are not a physical entity but a result of a specific configuration of the PLD.) As will be described later, this detailed information is useful for elimination of noise, temperature and environmental correction, and perfection of the entropy characteristics of the test.

The two key components of an AUF in accordance with the present invention are (1) the element and (2) the measurement technique. The test element is defined as the component, that through some process of design, represents a specific characteristic or phenomenon of physics and can be measured to provide a scalar or vector reference value related to the specific phenomenon. The phenomenon may be color, size (dimension), mass, dynamic delay, voltage, current, chemical composition, or any other phenomenon or characteristic that can be effectively measured. The measurement technique should be accurate and consistent enough to reliably detect the differences between implementations of the AUF array.

Figure 3:
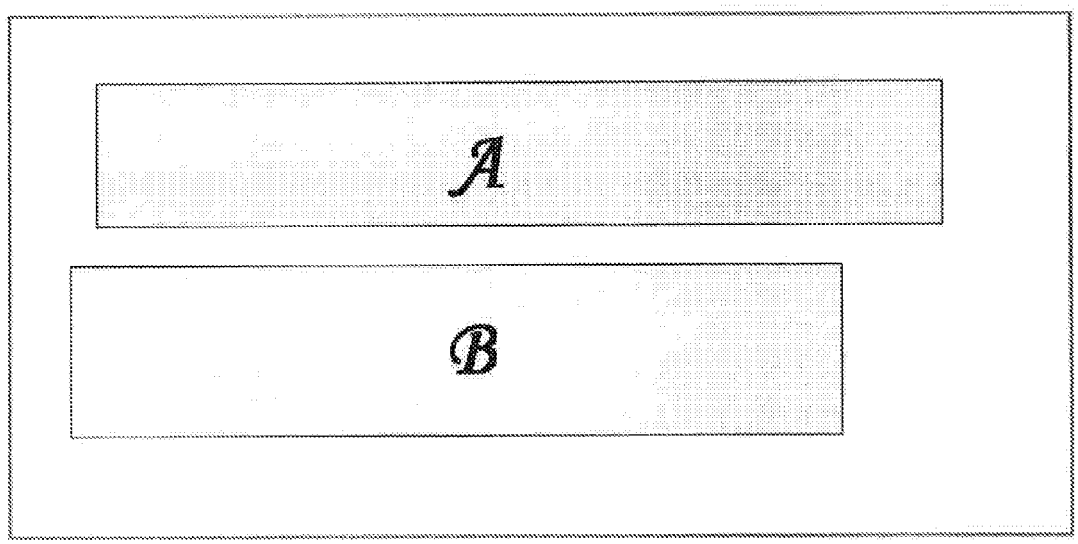
FIG. 3 is a comparison of arbitrary rectangles.

For example, FIG. 3 shows two sample rectangles. You may say that "A is longer than B" or that "B is wider than A."

You could similarly document that one of the rectangles is oriented further in one direction than the other, or has a specific color or hue or any number of characteristic differences. But if you really desired to present some accuracy in your comparison, you could measure, to some level of accuracy, how much longer one item is than the other (either as an absolute length or as fraction of the length of the other shape). This measurement provides a multi-bit scalar value having a relative digital accuracy, such as 8-bit or 16-bit accuracy, depending upon the specifics of the measurement circuitry employed.

If the two rectangles were actual physical entities that had been designed to be identical, the difference between the measurements of the two items would be based on the manufacturing tolerances used to produce these devices. Based on the accuracy of the measuring equipment used, and employing techniques as discussed below in accordance with the present invention, one could even correct the measurement differences for environmental effects such as temperature, barometric pressure, even gravitational differences.

Figure 4:
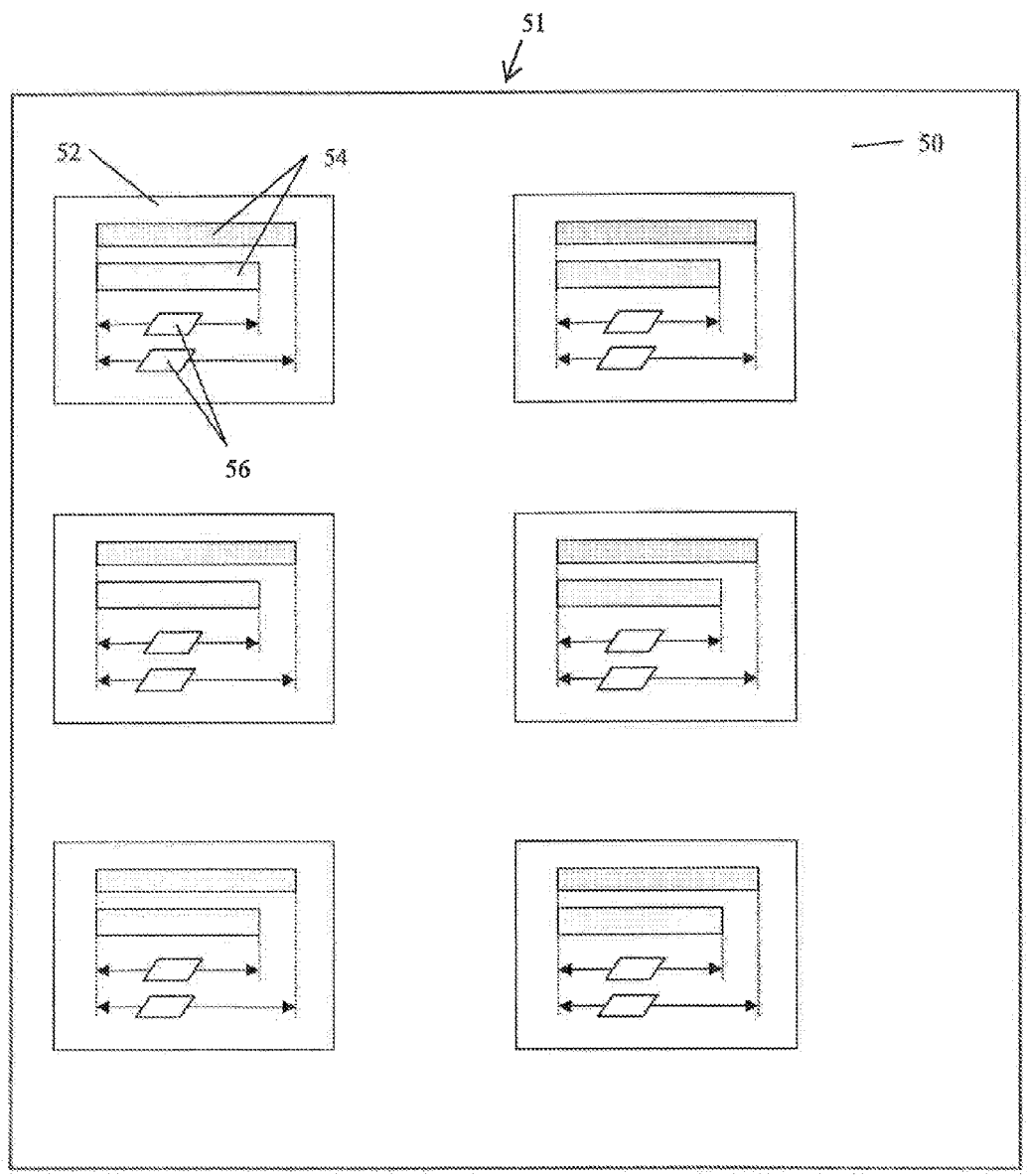
FIG. 4 illustrates a general case AUF composed of similar cells each containing arbitrary characteristic elements (such as the rectangles from FIG. 3) and measurement devices.

FIG. 4 shows an AUF array 50 composed of similar AUF cells 52. The term "similar" as used herein is intended to mean that the same type of test element 54 representing the same physical phenomenon or characteristic is used in each AUF cell 52 with the same measurement technique 56. The test elements 54 in each AUF cell 52 may vary by some value of the characteristic (such as by size, shape, color delay, voltage, current).

The resulting measurements are compared to each other (as described further later in this document) to determine the identity or pedigree of the electronic system containing the AUF array 50; that is, the electronic system into which the AUF array 50 is integrated.

In actual usage PUFs are not designed for accuracy of measurement but to provide unique verification codes. The present invention provides a mechanism whereby the measurement of arbitrary structures provides better identification and quantifies the difference (between two structures).

In accordance with the present invention, AUFs are used to identify subtle differences between seemingly identical integrated circuits. AUFs in accordance with the present invention are designed so that the unique operation of each particular implementation is a result of the manufacturing tolerances built into the integrated circuit. AUF technology as disclosed herein may be used in a variety of electronic devices, for example, for security systems and to authenticate hardware in military and commercial systems.

As discussed above in the Background of the Invention, Physical Unclonable Functions provide a secure method of deriving a unique code from electronic devices without embedding any memory cells or registers that can be counterfeited. However, each test associated with a conventional symmetric PUF produces only one bit. In the AUF in accordance with the present invention, each test produces a multi-bit vector response (based on the challenge) that is processed to produce the result.

The AUF of the present invention does not share the problems associated with symmetric PUFs as discussed above in the Background section because all of the circuits (that is, AUF cells) are designed to be intentionally different so that the differences can be measured. An AUF utilizes structures that may be specifically designed to be different or structures that are known to be different due to design constraints such as the use of pre-existing routing resources that are unequal or uneven. The AUF process measures the difference between the various structures and produces a multi-bit vector value that represents the magnitude of the difference between the structures.

As shown in FIG. 4, and as briefly discussed above, an AUF array 50 is composed of numerous AUF cells 52. Within each AUF cell 52 are test elements 54 (that represent some characteristic or phenomenon of physics) and measurement devices 56. It is appreciated, this basic structure may be employed for a variety of test element forms and a variety of suitable measurement techniques. It is further appreciated, every implementation of the AUF structures will be different due the limitations of manufacturing tolerances. Such an AUF array 50 would ultimately be associated with a system 51 which is desired for evaluation in accordance with the present invention. For example, the system 51 might take the form of an integrated circuit (as discussed below) employed in an electronic device. It is also appreciated, the system might take the form of a mechanical or physical system.

Figure 5:
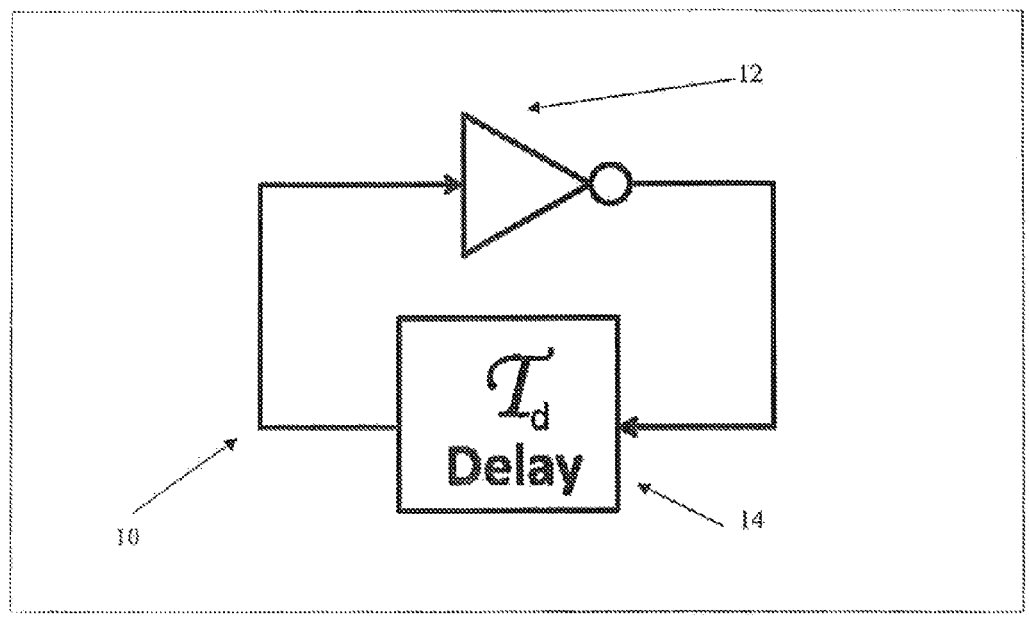
FIG. 5 shows a basic oscillator.

In order to understand the method of measuring and comparing AUF element outputs in accordance with a preferred embodiment of the present invention, a review of simple oscillator dynamics is useful. As shown in FIG. 5, an oscillator 10 may be constructed of an ideal inverter 12 and some time delay 14. An ideal inverter 12 is a virtual device that produces a logical inversion with no related timing delay. A functional (real world) inverter includes both the inversion function and some time delay. In understanding the method of constructing and analyzing existing binary AUF implementations it is helpful to understand the combination of all delay effects separate from the inversion function.

In ring oscillators, the time delay is composed of a number of functional inverters (an odd number of typically 3 or more inverters). The inversion function of one of the inverts can be modeled as the ideal inverter and the total delay of all of the inverters and routing between inverters may be combined into the delay element. By modeling the oscillator in this manner it becomes obvious that any suitable delay element (physical, electrical, chemical) may be used to create an oscillator (as is shown in U.S. Pat. No. 8,384,415, entitled "METHOD AND SYSTEM FOR IDENTIFYING COUNTERFEIT PROGRAMMABLE LOGIC DEVICE," which is incorporated herein by reference, as well as other applications).

Figure 6:
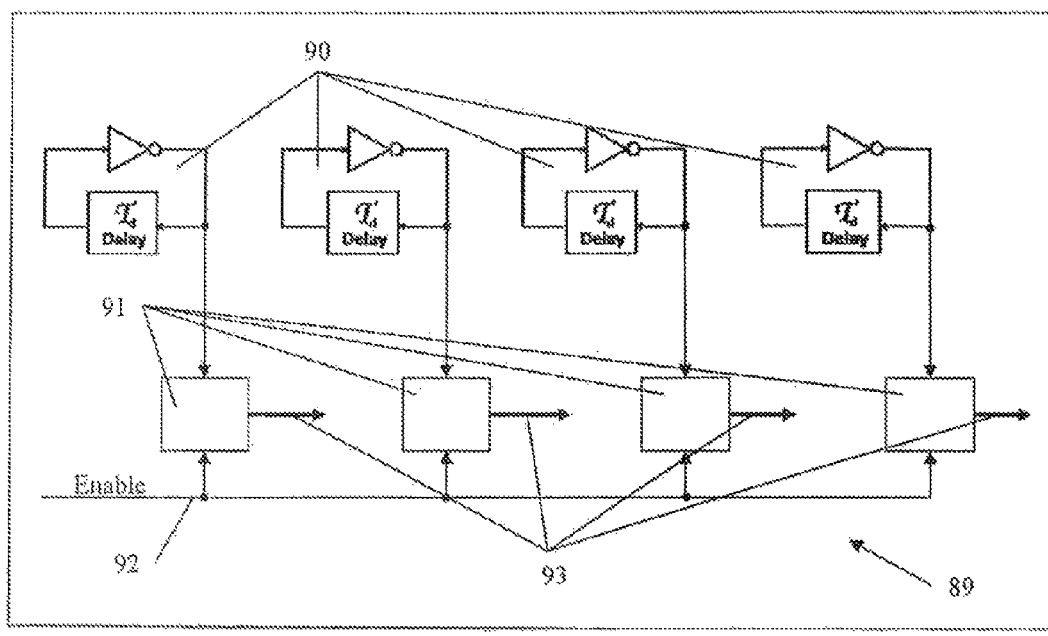
FIG. 6 illustrates an array composed of basic oscillators as the characteristic element and binary counters as the measurement devices.

As shown in FIG. 6, an AUF may be composed of numerous oscillators 90 as a ring oscillator array. In accordance with the various embodiments disclosed herein where the AUF is electronically based and intended for use in conjunction with an electronic system, the AUF is constructed from a programmable logic device. It is appreciated that programmable logic device is used throughout the present application to broadly reference programmable electronic systems as understood by those skilled in the art. It is, however, also appreciated AUFs in accordance with the present invention may be constructed in "hard" (that is, non-programmable) devices as well. For example, it is appreciated, AUFs in accordance with the present invention may be implemented, by way of example, in an ASIC (Application-Specific Integrated Circuit), HDMI (High Definition Multimedia Interface) video processors, and NAND Flash controllers, just pick just a few random examples.

Each oscillator 90 (functioning as a test element) has a related binary counter 91 (for use as the measurement device) such that all of the binary counters 91 share an enable signal 92. The output 93 of the binary counters 91 is used to create the AUF response and employed in the evaluation and analysis of the integrated circuit, or other electronic systems, with which the AUF 89 is associated. As discussed with reference to FIG. 5, each oscillator 90 employs an inverter function and a delay element. The various oscillators in the AUF may be designed identically but will have variations based on manufacturing variation and will perform slightly differently due to those manufacturing variations. The oscillator 90 may also be different by design by having different delays. An array made up of non-identical oscillators 90 may be referred to as asymmetric because the construction of the array is not uniform. The asymmetric array may be constructed of any combination of inversion and delay functions as will be described herein below.

Figure 7:
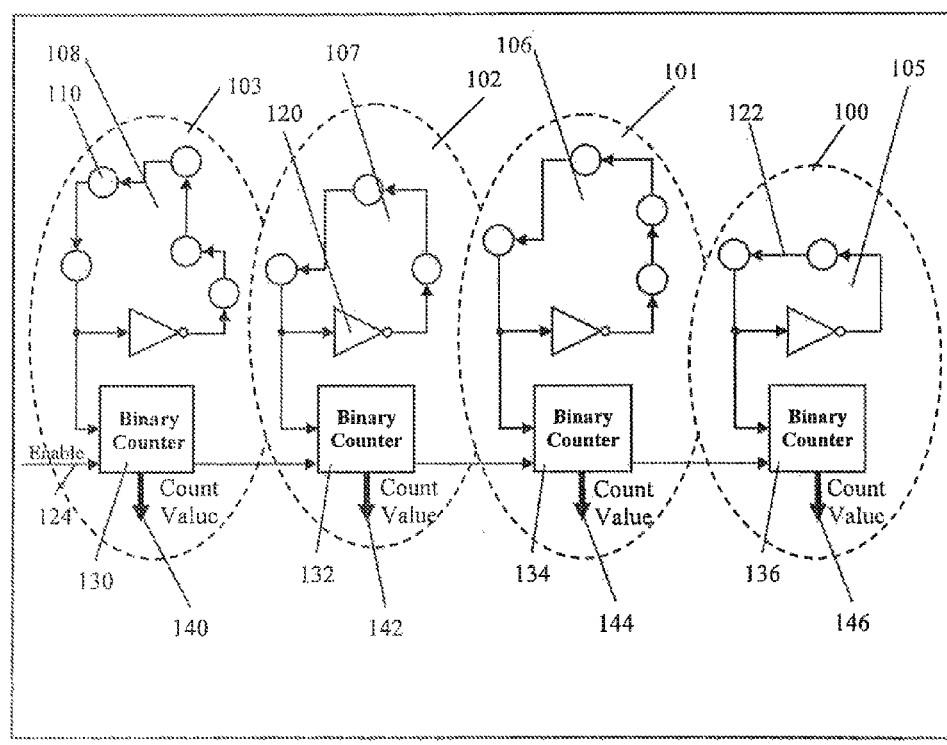
FIG. 7 is a circuit diagram of an asymmetric array that employs non-identical ring oscillators as the characteristic elements and binary counters as the measurement device in accordance with the present invention.

As such, a simple AUF is constructed of numerous ring oscillators 105, 106, 107, 108, each with a different routing structure 122 and a different number of delay elements 110 as shown in FIG. 7. In FIG. 7 the ring oscillators 105, 106, 107, 108 constitute the test element and the binary counters 130, 132, 134, 136 serve as the measurement devices. The difference between these ring oscillators 105, 106, 10, 108 is measured by allowing operation thereof over a specific period of time. It is appreciated, additional challenge variables can be developed by adding multiplexers and delay variations as well as by altering the time increment that the ring oscillators 105, 106, 107, 108 are tested. The binary counters 130, 132, 134, 136 in FIG. 7 share an enable signal 124 that allows the binary counters 130, 132, 134, 136 to evaluate the operation of the respective oscillators 105, 106, 107, 108 over a specific period of time.

Figure 2:
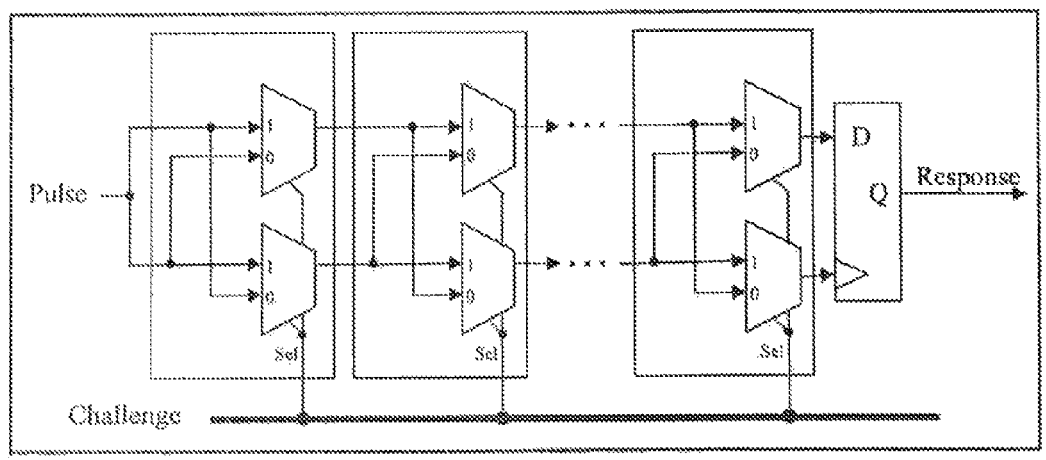
FIG. 2 is a circuit diagram of conventional PUF elements or cells, specifically, an arbiter PUF.

Since an oscillator 10 (as illustrated in FIG. 5) converts a time delay to a frequency measurable by a binary counter, any phenomenon that creates a delay can be employed to create an oscillator and the oscillator may be constructed in an electronic, electromechanical, mechanical, or physical system. Therefore, it is appreciated constructing an AUF in accordance with the present invention from oscillators is not limited to an oscillator composed of a ring of inverters as is the case with a ring oscillator. The arbitration paths that make up the arbiter PUF illustrated in FIG. 2 may be connected to an inverter and allowed to oscillate and then employed in an AUF. A mechanical delay may be employed or an optical delay. The oscillator based AUF is not limited to ring oscillators and is not limited to identical oscillators.

In accordance with the present disclosure, the process of correcting the variation in the operation of the ring oscillator is referred to as "compensation". The AUF is constructed of a plurality of oscillators (typically much more than 3 oscillators) and the oscillators are allowed to operate for some predetermined period of time while the oscillations are counted. The count of oscillations is not converted to a frequency value, although it is appreciated to represent a frequency. The count value is maintained as an unprocessed measurement value based on the time interval of the test. The goal of compensation is to ensure that whenever a specific time interval is chosen, the result is the same regardless of the temperature, the operating voltage, or the transistor aging effects. This is achieved in accordance with the present invention by actually adjusting the time interval based on temperature, voltage, and other influences as is discussed below.

It can be shown that the difference in frequency can be much greater due to temperature than due to subtle changes between each integrated circuit. Because of this fact (that changes due to temperature are greater than changes due to differences between integrated circuits), temperature compensation must be applied in order to produce a reliable discrimination between integrated circuits or between an integrated circuit without malicious content and one with malicious content. Similarly, the frequency difference due to operating voltage can be greater than the frequency difference due to manufacturing tolerances. The frequency difference due to transistor aging is more subtle, but still adds error to the system result.

Jyothi (U.S. Patent Application Publication No. 2012/0278893) discusses establishing a golden frequency for a ring oscillator implemented in each integrated circuit. In order to utilize this golden frequency, the effects of temperature, voltage, and aging must be corrected or compensated. Trimberger (U.S. Pat. No. 7,941,673) discusses using a ratio of the frequencies of two ring oscillators. While this technique may be useful, the present invention provides a greatly improved method for establishing the identity of, and trust in, the integrated circuit.

Devadas (U.S. Pat. No. 7,757,083) uses a single bit output. As discussed later in more detail, the single bit result does not provide the same opportunity for compensation as the multi-bit result.

In order to produce a consistent result, the output values produced by the AUF cells in accordance with the present invention are modified by two processes: environmental compensation and scaling.

Environmental Compensation

Figure 8:
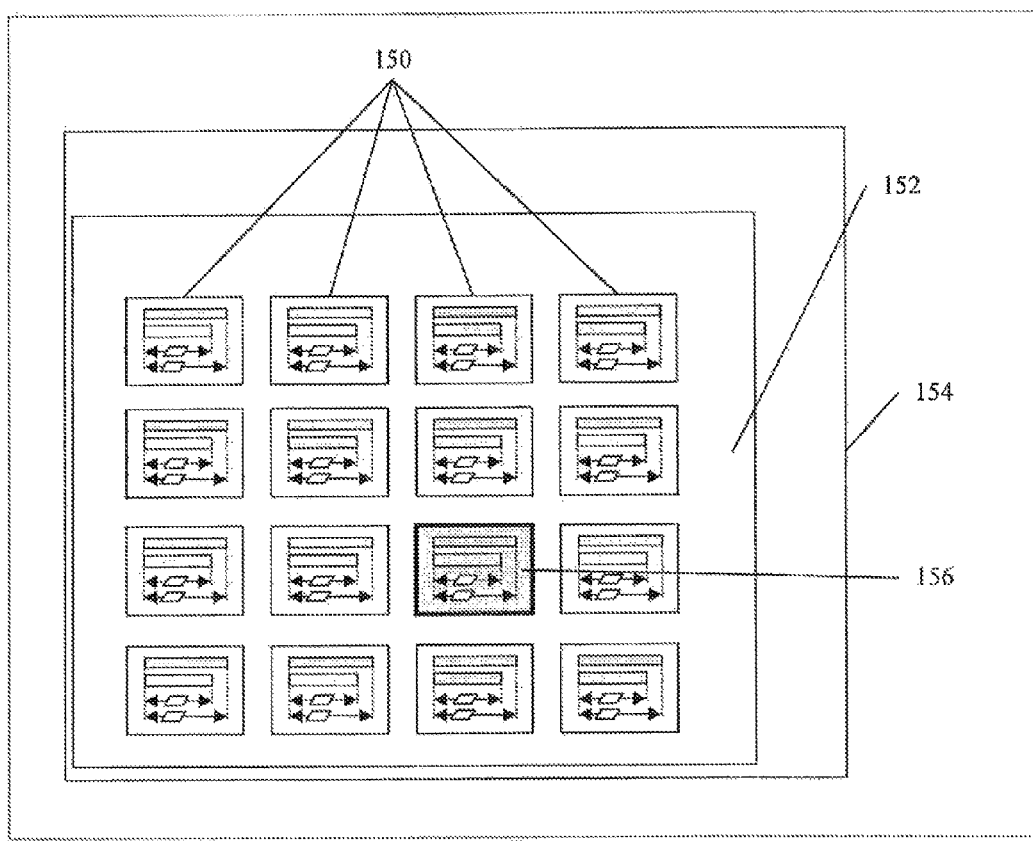
FIG. 8 illustrates an asymmetric array composed of similar cells in which one cell is designated as a Reference cell and other cells are designated for evaluation purposes.

The Asymmetric Unclonable Function in accordance with the present invention provides compensation for environmental effects by use of reference cells similar to the evaluation cells. The reference cells determine the time interval (test period) used to evaluate the evaluation cells. Environmental changes affect the reference cell in the same manner that they affect the evaluation cells. By way of example, and as shown in FIG. 8, an integrated circuit 154 (that is, the electronic system under evaluation) contains an AUF 152 composed of an array of AUF cells 150. Each AUF cell 150 is built of the same type of structure but the AUF cells 150 do not have to be identical. There may be differences in the number of logic elements, difference in the routing paths and routing resources, or differences in the placement (location) of the cells within the integrated circuit. The cells may have differences (asymmetrical) but must be of the same type of cell (i.e. the same type of test element and the same type of measurement device). One of the cells is selected for use as the reference cell 156 and the other cells are designated as evaluation cells.

In the case of a ring oscillator based AUF, one cell is used as a reference cell while the other cells are used for evaluation (as an example, any of the cells in FIG. 8 may be selected as the reference cell). The reference cell is used to determine the time period over which the evaluation ring oscillator are operated (the test period). In the case of a different type of measurement device, a different compensation process would be employed based on the operation of the reference cell.

Figure 9:
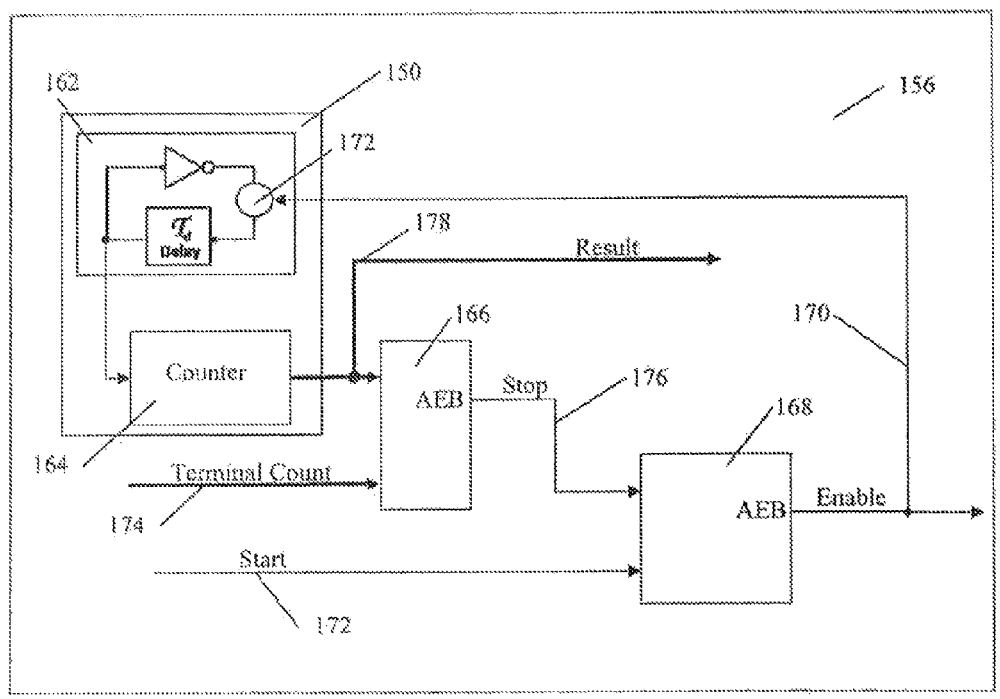
FIG. 9 illustrates the functionality of an AUF Reference Cell

FIG. 9 shows a preferred embodiment of a reference cell 156 that may be employed in an array of AUF cells 150 as discussed above with regard to FIG. 8. The reference cell 156 includes components similar to the standard AUF cells 150 as described above (that is, the reference cell 156 contains an oscillator 162 for the characteristic element and a binary counter 164 as the measurement device). The reference cell 156 also includes a comparator 166 and a signal generating device 168, which are integrated with the AUF cell 150 to implement the reference function. The comparator 166 receives the output value of the oscillator binary counter 164 and a terminal count value 174. It is appreciated the signal generating device 168 may be composed from a flip flop or other suitable circuitry. The purpose of the signal generating device 168 is to output an enable signal 170 controlling operation of the remaining evaluation cells 150. When the appropriate start signal 172 is received by the signal generating device 168, the enable signal 170 becomes active. When the result 176 of the comparator 166 indicates that the AUF cell result 178 matches the Terminal Count value 174, the signal generating device 168 deactivates the enable signal 170. The enable signal 170 controls an enable element 172 in the oscillator 162 of the AUF cells 150 within the AUF 152 such that the oscillator 162 only operates when the enable signal 170 is active. The time during which the enable signal 170 is active is referred to as the test period or test interval. The enable signal 170 is used to enable all of the AUF cells 150 (see FIG. 8) of the AUF 152 so that all of the cells operate over the same time period. The enable signal 170 may also be used to control the binary counters 164 in all of the AUF cells 150. Not shown in this example are the methods for accessing the result data 178 and clearing the binary counters 164 before the next AUF operation. Such methods are well known to those skilled in the art and are not the subject of the present disclosure.

By using one AUF cell as the timing reference cell, the environmental effects on all the AUF cells are greatly reduced, if not entirely eliminated. The AUF cell selected as the reference cell will operate at the same silicon temperature, use the same input voltage, and experience the same transistor aging effects as the evaluation cells. The reference cell serves as the primary compensation device by determining the time interval (test period) over which to operate the evaluation cells. If variation in temperature causes the evaluation cell to operate at higher or lower frequencies, the reference cell similarly operates at a higher or lower frequency producing a similarly lengthened or shortened test period and thereby eliminating the temperature effect. If variation in voltage causes the evaluation cells to operate at a higher or lower frequency, the reference ring also operates based on the changes to the power voltage and eliminates the voltage effect. The AUF cells are all operated identically (i.e. all enabled at the same time and all disabled, or turned off, at the same time) in order to ensure that all the transistors age as identically as possible. Operating the cells identically does not eliminate the effects of silicon aging. This technique only ensures that all of the transistors and, by extension, all of the cells age at the same rate so that effect of aging is compensated by the reference cell in the same manner as the other environmental effects.

The division process referenced in other patents serves to perform some compensation function but it can be shown that this process is not as accurate as the reference cell based compensation process described here.

In AUF arrays based on different characteristic elements and different measurement techniques, it is appreciated the compensation may be employed differently such as using the reference value to electronically compensate an amplifier, a voltage meter, or other measurement device.

Scaling

Second, scaling is applied to the evaluation outputs values of the measurement devices (for example, see binary counters 130, 132, 134, 136 of FIG. 7) by subtraction. After the AUF cells 150 have been operated over a specified time interval (and that time interval has been adjusted for compensation to environmental effects based on the operation of the reference cell 156), one of the evaluation output values is subtracted from another evaluation output value to scale the data.

For the purposes of this application, subtraction is defined as the mathematical process where a subtrahend value is subtracted from a minuend value to produce a difference result (minuend−subtrahend=difference). It should also be noted, that in binary systems, addition and subtraction are basically the same operation. With subtraction, a negative form of the subtrahend (typically 2's complement format in binary systems) is added to the minuend. Multiplication and division are much more involved and require more resources and time to perform. For multiplication, multiple adders are required to combine the partial products and for division multiple subtractions are required, one for each digit of the operation (or for each digit of result). In the case of division there is also the problem of remainders and repeated decimals based on numbers that do not divide evenly (are not products of each other).

A specific AUF cell may be selected as subtrahend, or the outputs may be evaluated and the lowest (least) evaluation output selected as the subtrahend. After the selection of the subtrahend and the subtraction process, N−1 results remain from the N number of evaluation cells. These N−1 values represent the DIFFERENCE between the structures being evaluated and are unique for each silicon implementation.

Specifically, an AUF may be composed of 130 AUF cells, each AUF cell composed of an oscillator as the characteristic or test element and a binary counter as the measurement technique. One of the AUF cells is designated to be the reference element and one AUF cell is used as the subtrahend element. Each time a test is performed on the array of AUF cells, the result is 128 compensated and scaled values that may be used to identify the specific integrated circuit, to provide information about the integrated circuit family, or to produce a cryptographic key.

Oscillator Based AUF

FIG. 7 shows oscillators 105, 106, 107, 108, for example, ring oscillators in accordance with a preferred embodiment, that differ in both the number of delay elements 110 (for example, various circuit elements causing a time delay between an input and an output) and in routing structure. Each oscillator 105, 106, 107, 108 includes multiple delay elements 110, an inverter 120, and routing elements indicated by thin black arrows such as item 122. Binary counters 130, 132, 134, 136 are also provided with each oscillator 105, 106, 107, 108. The binary counters 130, 132, 134, 136 share an enable signal 124 and produce evaluation output values in the form of count output values indicated by thick black arrows 140, 142, 144, 146. It should be noted that the count output values 140, 142, 144, 146 are multi-bit vectors, not single bit outputs. Each of these oscillator/counter combinations represents an AUF cell 100, 101, 102, 103 and will operate at different frequencies. The difference in the operating frequency of each oscillator 105, 106, 107, 108 is a function of (1) its design, which includes the number of delay elements 110 and the routing paths 122, (2) the temperature of the silicon, (3) the supply voltage, (4) transistor aging effects, and (5) the manufacturing tolerances of the device in which the oscillators are implemented. When these four AUF cells 100, 101, 102, 103 are implemented identically in numerous devices, the relative operation of the each oscillator 105, 106, 107, 108 will be slightly different in each device. Additionally, the relative differences between each oscillator 105, 106, 107, 108 will be unique in each device. Using the relative differences is important for compensation to cancel variation due to temperature, power supply voltage, and aging as previously discussed.

The count output value 140, 142, 144, 146 of the binary counter (count value) 130, 132, 134, 136 of each AUF cell 100, 101, 102, 103 is compared to the count output value 140, 142, 144, 146 of the binary counters 130, 132, 134, 136 of the other AUF cells 100, 101, 102, 103. The AUF response is the comparison of the count value outputs, not the count values themselves. Each time these four ring oscillators 105, 106, 107, 108 are implemented identically (that is, as a ring oscillator structure) in a different integrated circuit, the difference between the count output values (after compensation) will be unique.

Figure 10:
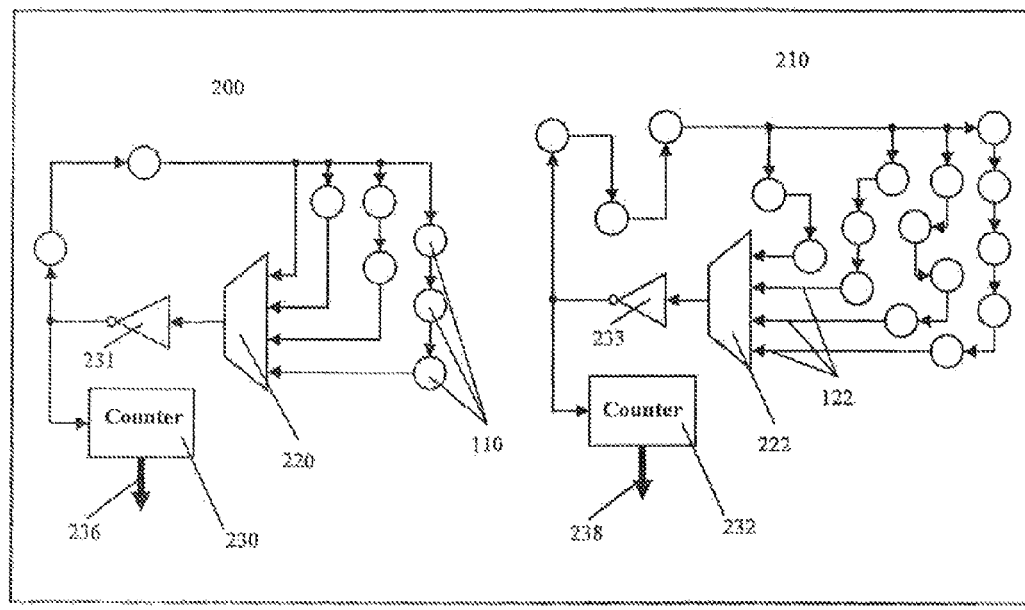
FIG. 10 is a circuit diagram of asymmetric ring oscillators with multiplexed rout lengths in accordance with the present invention.

FIG. 10 illustrates a method of combining numerous ring oscillator options using multiplexers. Two ring oscillator structures 200, 210 are each constructed of a multiplexer 220, 222, an inverter 231, 233, delay elements 110, routing resources 122, and binary counters 230, 232 with multi-bit vector outputs 236, 238. Each of the ring oscillator structures 200, 210 includes sub-rings that are enabled by the selection of the multiplexers 220, 222. The left hand ring oscillator structure 200 can operate as a ring with 2, 3, 4, or 5 delay elements 110 while the right hand ring oscillator structure 210 can operate as a ring with 5, 6, 7, or 8 delay elements 110. It is appreciated that because these delay elements 110 may or may not be inverters, an even number of delay elements is feasible. As discussed earlier, the ring oscillators are used to convert a delay to measureable oscillation. The ring oscillator structures 200, 210 are designed to operate simultaneously so that each binary counter 230, 232 will simultaneously produce an output value based on the multiplexer selection and previously mentioned dependencies (ring design, temperature, supply voltage, and manufacturing tolerances). It is appreciated, the ring oscillator structures may contain any practical number of rings depending on the size of the multiplexer and each ring may contain any number of delay elements. We have implemented rings with minimal delay elements and rings with hundreds of delay elements.

As discussed above, the ring oscillator structures 200, 210 may be used simultaneously to produce count output values 236, 238 for comparison in accordance with the present invention. It is further appreciated, the multiplexer 220, 222 of one of the ring oscillator structures 200, 210 may be cycled through the various delay element 110 options to produce count output values 236, 238 that may be compared for the identification of integrated circuits in accordance with the present invention.

The ring oscillator presents a number of opportunities and challenges as an AUF. First, the ring oscillator and all AUFs are sensitive to environmental effects such as temperature and changes in supply voltage. Actually, all semiconductor circuits and all PUF circuits are sensitive to these same environmental effects.

The principal difference between the traditional electronic PUF circuits and AUF circuits in accordance with the present invention is single-bit response (in the traditional PUF systems) compared to a vector response provided by the AUF of the present invention. The basic cells of classic PUF structures produce single bit responses. As such, in order to produce a 256-bit response using classic PUF structures, 256 PUF structures are constructed or multiple measurements are made from each PUF structure. The basic structure of an AUF in accordance with the present invention produces a multi-bit (or vector) result. A 256-bit response may be produced by combining 32 AUF structures, each with an 8-bit output. Further, because the multi-bit vectors are scalar and linear, the results from multiple AUF structures may be combined to improve Stability, Entropy, and Variation. For instance, voltage and temperature variation may be corrected by comparing the results from a number of structures.

Example System

Figure 11:
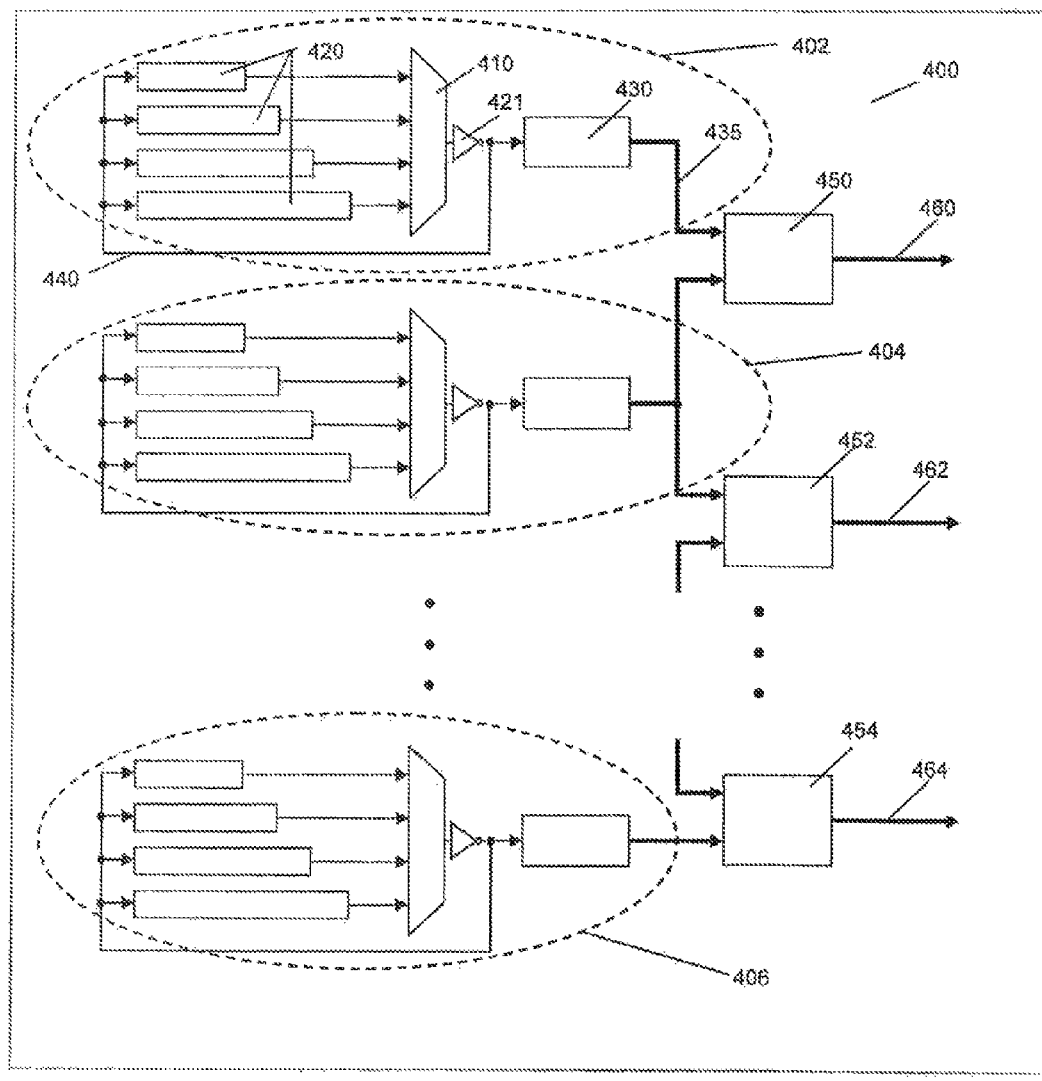
FIG. 11 is a circuit diagram of an AUF in accordance with the present invention.

Referring to FIG. 11, an example AUF system 400 in accordance with the present invention is disclosed. The AUF system 400 is constructed of a large number of ring oscillator structures 402, 404, 406 (as shown in FIG. 11), each structure with a large number of ring options. Each ring oscillator structure may have a different number of delay elements, or each ring oscillator structure may have different routing paths, or a combination of both of these conditions may exist.

As shown in FIG. 11 an AUF 400 is constructed of a plurality of AUF cells (or ring oscillator structures) 402, 404, 406. Each ring oscillator structure 402, 404, 406 is composed of a multiplexer 410, an inverter 421 (which may be incorporated into the multiplexer), groups of delay elements 420, a binary counter 430, and routing resources 440. It is anticipated that one of the ring oscillator structures is designated as a reference cell for compensation purposes and that one ring oscillator structure (either statically or dynamically selected) will be used to produce the subtrahend value for scaling and to produce the cell differences.

As shown in FIG. 11, the frequency of each ring oscillator structure 402, 404, 406 is measured by a binary counter 430. The output 435 of each binary counter 430 is routed to at least two comparison units 450, 452, 454 for the performance of a mathematical function as explained below. A number of important points must be explained about the comparison units 450, 452, 454. First, the output 460, 462, 464 of the comparison units 450, 452, 454 are also multi-bit vectors or multi-bit values that are used to compose the AUF response. Unlike traditional PUFs, a single bit value is not produced. Second, the comparison units 450, 452, 454 may utilize division, subtraction, integral differentiation, or other mathematical functions. The comparison units 450, 452, 454 are not comparators designed to indicate which value is greatest but are mathematical operators designed to indicate the magnitude of the difference based on some mathematical operation such as subtraction, division, or integration. It is appreciated, there may be any number of comparison units.

A single comparison unit may implement all of the comparison functions for a group of structures, however, the number of result values produced always reduces to the number of ring oscillator structures 402, 404, 406 minus two (in particular, the result value reduces by the value being subtracted out and the reference value that always will have the same terminal count). That is, as the results of each ring oscillator structure operation are evaluated, there will be some counter output value that is a common point of the mathematical operation that is eliminated by its commonality. For instance, if the operation is subtraction, the result of all subtractions will eventually be that the least value is subtracted from all other values. When the least value is subtracted from itself, the result is zero and that term is eliminated. Similarly, for division or normalization, the least value becomes one and for integration or differentiation, the constant value is eliminated.

It is important to note that the comparison that is made by comparison units 450, 452, 454, is not a comparator that returns a single bit result such as A>B. The comparison units 450, 452, 454 provide a multi-bit result of a subtract, a division, or a differentiation (calculus differentiation being an indication of change such as the change in voltage over time, dv/dt). As discussed above, all measurements, whether voltage, current, mass, frequency, delay, are produced by multi-bit devices such as 12-bit or 16-bit Analog to Digital converter or the counters described in this application which are typically 12-bit to 16 bit counters (we anticipate the use of other bit widths). The primary point is that a measurement is made with multi-bit accuracy and the measurements are compared with some mathematical function (typically subtraction, but other functions may be employed) that produces a multi-bit result.

The multi-bit result is important for determining the magnitude of differences between devices and for determining similarities between devices. The power of the AUF is the ability to demonstrate similarities between devices as well as differences.

Figure 12:
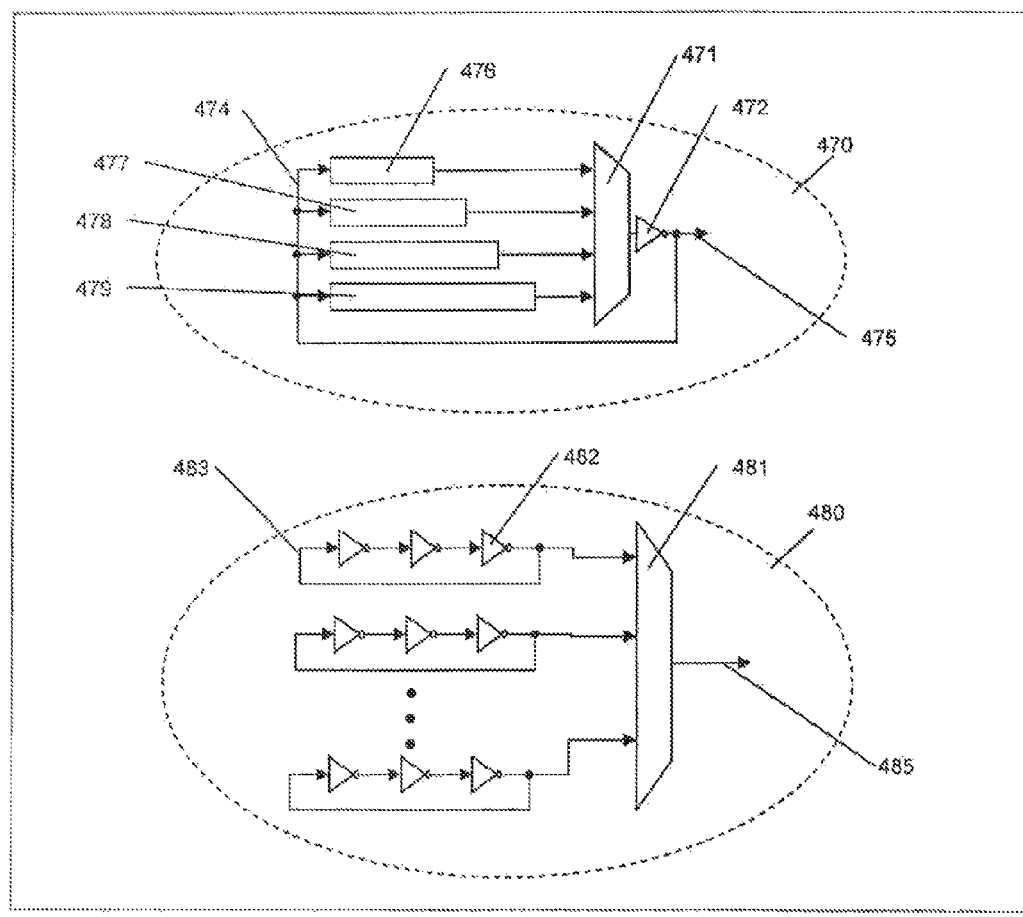
FIG. 12 provides a comparison of symmetric ring oscillator PUF elements and ring oscillator AUF elements in accordance with the present invention.

FIG. 12 shows a comparison of an AUF element 470 composed of ring oscillator structures and a traditional symmetric PUF element 480 composed of ring oscillators. The AUF element 470 is basically one ring oscillator with optional delay paths. The PUF element 480 is composed of multiple independent ring oscillators 483 multiplexed together using multiplexer 481. The PUF ring oscillators are independent of each other, each including their own inverters 482 and each having independent routing resources 483 that are not shared in any manner. The AUF element 470 uses a single inverter 472 shared by all of the ring options and the multiplexer 471 is internal to the ring. The multiplexer 471 itself adds asymmetry to the AUF element 470 and would not be tolerated in a traditional PUF design. The AUF element 470 includes delay elements 476, 477, 478, 479 that are each of unique magnitude (as also illustrated in FIG. 10) and may be composed from any suitable delay device such as a non-inverting buffer of a mathematical function as will be discussed later. Additionally, the delay paths provided by the delay elements 476, 477, 478, 479 share routing resources 474. As will be understood by one skilled in the technology of unclonable functions, PUFs require careful placement and routing (in other words careful selection and utilization of logic and routing resources) to insure symmetry; the AUF element 470 does not require this additional design effort since the AUF elements 470 are not intended to be equal. In short, the ring oscillator based AUF element 470 and PUF element 480 differ in at least the following ways: (1) uniformity of number and form of delay elements, (2) isolation, selection, and routing of signal routing resources, (3) sharing of resources, and (4) use of the multiplexer internal or external to the oscillating ring. In traditional or symmetric PUFs that utilize ring oscillators, the inverter must be intrinsic to each sub group and the ring must not include the multiplexer. This is because the multiplexer and its related components (logic cells and routing resources) may be asymmetrical in and of themselves. Since the AUF system of the present invention benefits from the asymmetry, each cell of delay elements may be interrelated sharing the multiplexer, inverter, feedback path, and even delay elements. This technique of sharing elements is very different from the ring oscillator PUF developed by Devadas, as disclosed in U.S. Pat. No. 7,757,083, and discussed in other patents and publications. In the symmetric ring oscillator PUF each ring must be independent and identical and do not share delay elements, inverters, routing resources, or multiplexer internal to the ring routing. It is explicitly anticipated AUF systems will be constructed using ring oscillators that each includes their own inverter and feedback path. Further, the comparison function may take place in a processor or central processing system and need not be performed in the logic device (FPGA or ASIC). The present AUF system may provide the counter outputs to a processor or communication system for processing at some other location.

Other forms of AUF are also anticipated wherein a plurality of non-identical functions are compared to determine the difference in the functions and thereby provide the identity or authenticity of the electronic device or electronic system tested.

In the case of AUF constructed of ring oscillators, the routing resources may include PCB (printed circuit board) traces, cabling components, and even communication interfaces such as optical transmitters, fiber optic transceivers and fiber optic cable, RF, and mechanical elements. These possibilities are quite impossible with traditional electronic PUFs because each of these signal routing paths would introduce such a large amount or asymmetry that the PUF elements or cells could not be considered reasonably identical and the traditional PUF structure would always give the same result regardless of manufacturing tolerances (some paths would always be longer regardless of manufacturing tolerances). In AUFs, long routing paths that create elements of greatly different size and delay are acceptable. The manufacturing tolerances will still be measureable and will still provide a unique identity for each unit.

Figure 13:
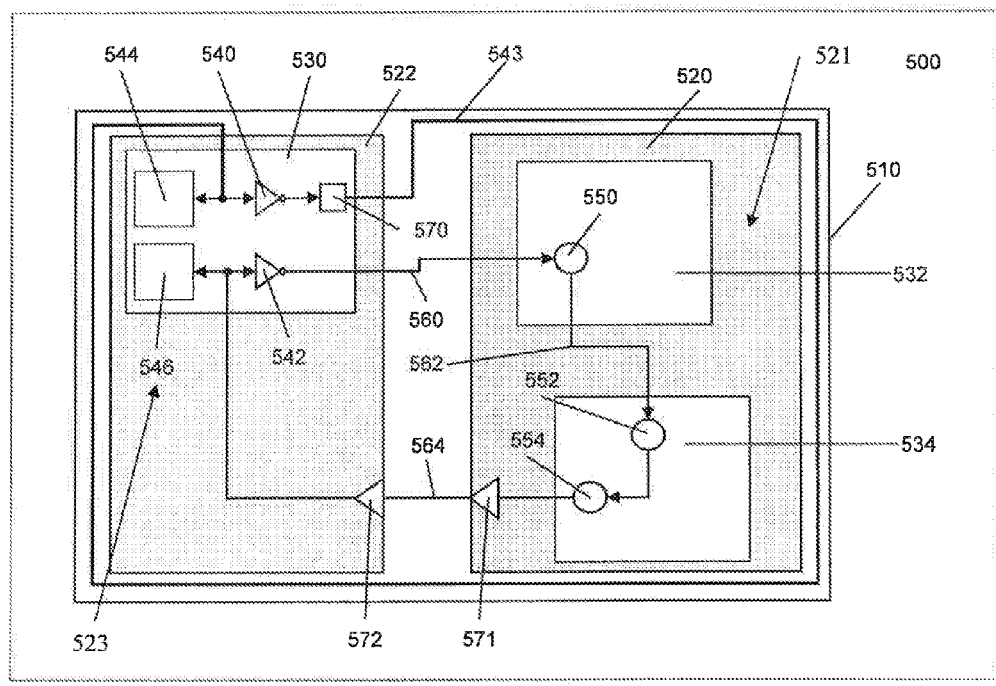
FIG. 13 discloses an AUF element incorporating printed circuit board traces and multiple integrated circuits.

FIG. 13 illustrates an AUF 500 that includes elements external to the integrated circuit that serve as the base for the PUF. In FIG. 13, an AUF 500 is composed of an enclosure 510 and a plurality of printed circuit boards 520, 522, each printed circuit board 520, 522 including a plurality of integrated circuits 530, 532, and 534, and other components not shown such as capacitors, inductors, resistors, transistors, diodes, and other integrated circuits. The AUF 500 also includes signal interconnection devices between the printed circuit boards 520, 522 such as cables, connectors, and/or back planes and other elements. The enclosure 510 may be a metal or non-metal enclosure, box, housing, or chassis.

In the FIG. 13 example, integrated circuit 530 includes inverters 540, 542 and binary counters 544, 546, which are necessary to implement an AUF in accordance with the present invention. The first AUF element, in the form of a first ring oscillator, 521 is implemented by routing the output of inverter 542 via signal 560 to delay element 550 which is contained in integrated circuit 532 on printed circuit board 520. Signal 560 may rout through a cable, discrete wire, or across a backplane. Signal 562 then routes from delay element 550 to delay element 552 in integrated circuit 534. Signal 562 is routed completely through printed circuit board 520. The output of delay element 552 routes (internally to integrated circuit 534) to delay element 554. The output of delay element 554 routes through printed circuit board 520 to transmitter 571 which transmits via media 564 to receiver 572. The output of receiver 572 then routes through printed circuit board 522 to integrated circuit 530 and to inverter 542 and counter 546.

A number of points should be emphasized about this first ring oscillator 521. First, the routing passes through a number of types of media including conductor implemented in the silicon, integrated circuit bond wires, printed circuit board traces, interconnection media such as cables, backplanes, and connectors. Next, the first ring oscillator 521 incorporates multiple integrated circuits. These integrated circuits 530, 532, 534 may be digital, analog, power electronics, or optical in nature or identified by some other technology. The delay elements 550, 552, 554 may be digital such as a buffer or inverter implemented in a number of ways; analog such as an operational amplifier or analog delay line; optical; or some other element that represents either an active or passive delay. The routing paths may include passive components. The transmitter 571 and receiver 572 may be electrical (such as RS485 or some other electrical format), optical, acoustic, RF, or other technology. The resulting ring oscillator frequency is a result of all of the elements and incorporates manufacturing tolerances of each element into the resulting frequency and the AUF result. An ideal AUF in accordance with the present invention would compare a number of ring oscillators composed of these same elements. Additionally, comparing the results of these ring oscillators that extend external to the integrated circuits to the results of asymmetric ring oscillators constructed internally to each integrated circuit provides additional authentication strength and helps eliminate variations due to temperature and power fluctuations.

The second AUF element, in the form of a ring oscillator, 523 is much simpler but provides useful capabilities. The output of inverter 540 routes to delay system 570. The output of delay system 570 routes out of integrated circuit 530, through printed circuit board 522 to conductor 543. Conductor 543 routes around the perimeter of the chassis or packaging and returns to the input of inverter 540 and counter 544. Delay system 570 may be a multiplexed system of delay elements as illustrated earlier in reference to the basic ring oscillators. Some delay element is necessary for reliable operation and a variable delay element is useful in characterizing an enclosure and/or electronic system. The careful routing of conductor 543 provides the ability to detect changes in the chassis/packaging 510 as well as detecting the placement of printed circuit boards 520, 522. This ring oscillator 523 operates partially as a metal detector incorporating the metal in the packaging 510 and the printed circuit boards 520, 522 and other printed circuit board components into the AUF analysis.

As with the previous ring oscillator, this simple packaging sensing ring provides the best results when the output of the binary counter 544 is compared to the output of binary counters connected to similar rings and also compared to the results from ring oscillator implemented completely internal to the integrated circuit.

Asymmetric Unclonable Functions may be composed of other structures besides ring oscillators. Following are examples of using arithmetic functions and memory for AUF implementation.

Diode Incorporating AUF

Figure 14:
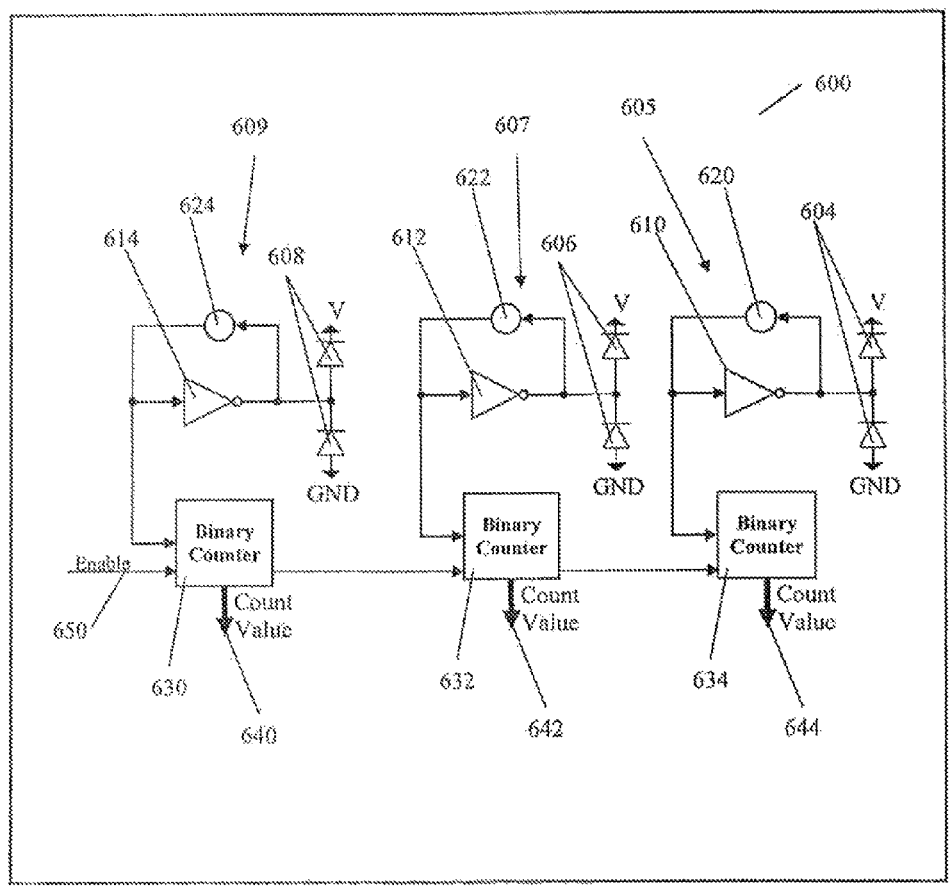
FIG. 14 discloses an AUF composed of AUF cells incorporating diodes.

FIG. 14 shows an oscillator based AUF 600 which has diodes 604, 606, 608 incorporated into the ring oscillators 605, 607, 609. The diodes 604, 606, 608 add asymmetry to the ring oscillators 605, 607, 609 and allow characterization of electrical characteristics of the diodes 604, 606, 608. The ring oscillators 605, 607, 609 are composed of suitable inverters 610, 612, 614 and delay elements 620, 622, 624. The diodes 604, 606, 608 are connected to the ring oscillators 605, 607, 609 and to ground and an appropriate voltage in a series connection as is used for ESD protection. The diodes may be external to the integrated circuit in which the AUF ring oscillators and counters are implemented. The impedance of the diodes 604, 606, 608 influences the operation of each ring oscillator 605, 607, 609 so that differences in the diodes 604, 606, 608 becomes part of the AUF response measured by counters 630, 632, 634. This AUF 600 is useful in detecting differences in discrete components and differences in integrated circuits that include ESD diodes at each pin. By measuring and comparing the response of the AUF based on the affects of the diodes determinations can be made concerning the quality or identity of the related diodes or the integrated circuit containing the diodes. Since many integrated circuits include ESD diodes, this is a useful method for identifying counterfeit integrated circuits and stressed or damaged integrated circuits.

Instead of diodes, transistors in various connection configurations may be used and even analog amplifiers may be incorporated in the AUF cell.

Arithmetic Based AUF

Figure 15:
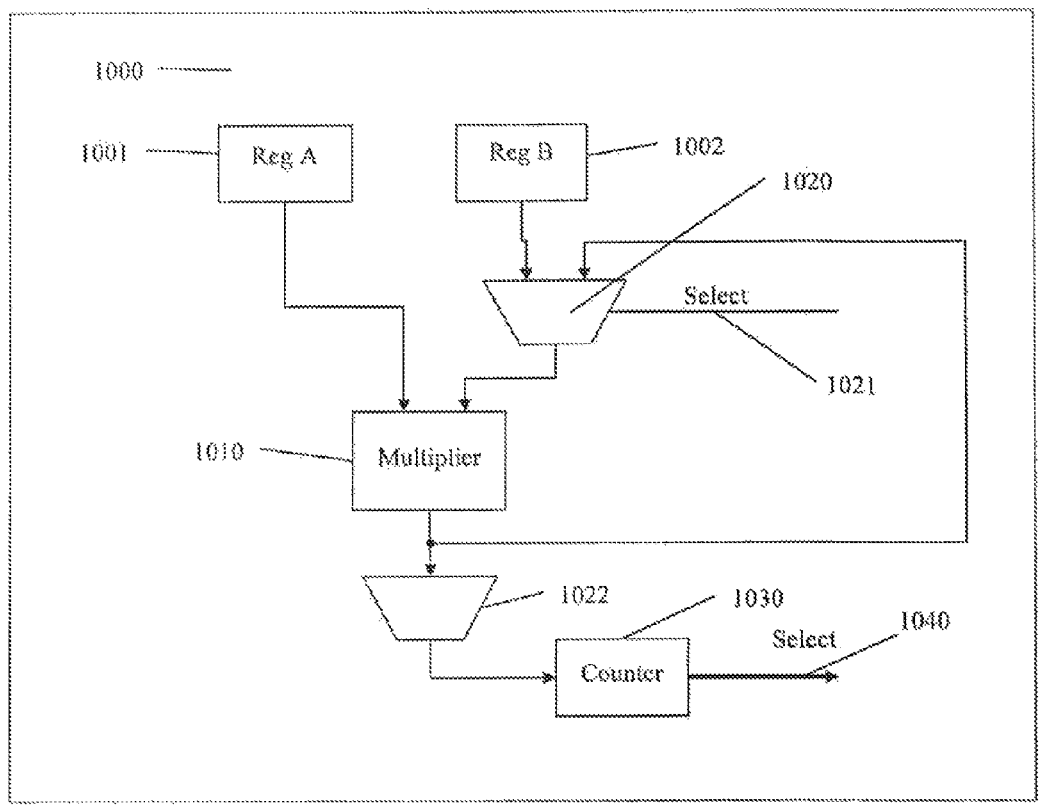
FIG. 15 discloses an AUF cell based on a binary multiplier.

As disclosed in U.S. Pat. No. 8,384,415, an oscillating system may be constructed from a binary arithmetic function such as a multiplier. FIG. 15 shows an example AUF cell 1000 constructed using a binary multiplier 1010 with associated input registers 1001 and 1002, a feedback multiplexer 1020, an output multiplexer 1022, and a binary counter 1030. Initial multiplicands are stored in the input registers 1001 and 1002. The select input 1020 to multiplexer 1021 is switched to allow feedback of the lesser significant bits of the multiplication result back into the multiplier. When this switch of inputs occurs, the multiplier 1010 begins a process of oscillating outputs as described in U.S. Pat. No. 8,384,415.

In the multiplier based AUF cell 1000 the multiplier 1010 is the test element and is quite asymmetric. The counter 1030 serves as the measuring device. Inversion is created by the multiplication terms selected or loading into registers 1001 and 1002.

Figure 16:
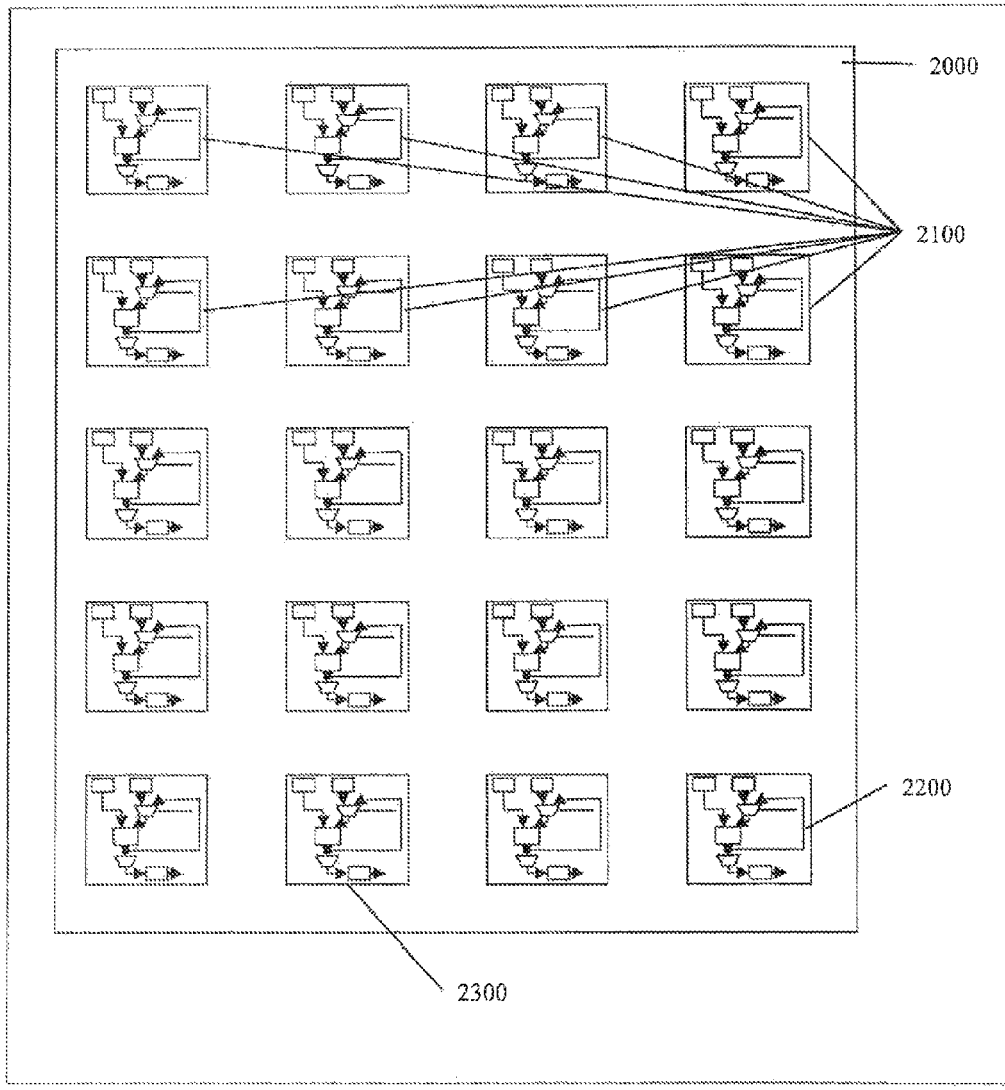
FIG. 16 discloses an AUF composed of multiplier based AUF cells.

Since modern FPGAs may contain hundreds and even thousands of multipliers, a large AUF array may be constructed using these Multiplier cells. FIG. 16 illustrates an AUF array 2000 composed of multiplier based AUF cells 2100. An AUF thus constructed would use the same techniques as previously discussed to designate one or more cells for compensation 2200 and one or more cells 2300 as minuend for result scaling. As described in U.S. Pat. No. 8,384,415 this technique is also applicable to binary division, addition, and subtraction, and to complete Arithmetic Logic Units (ALU).

Memory Based AUF

Figure 17:
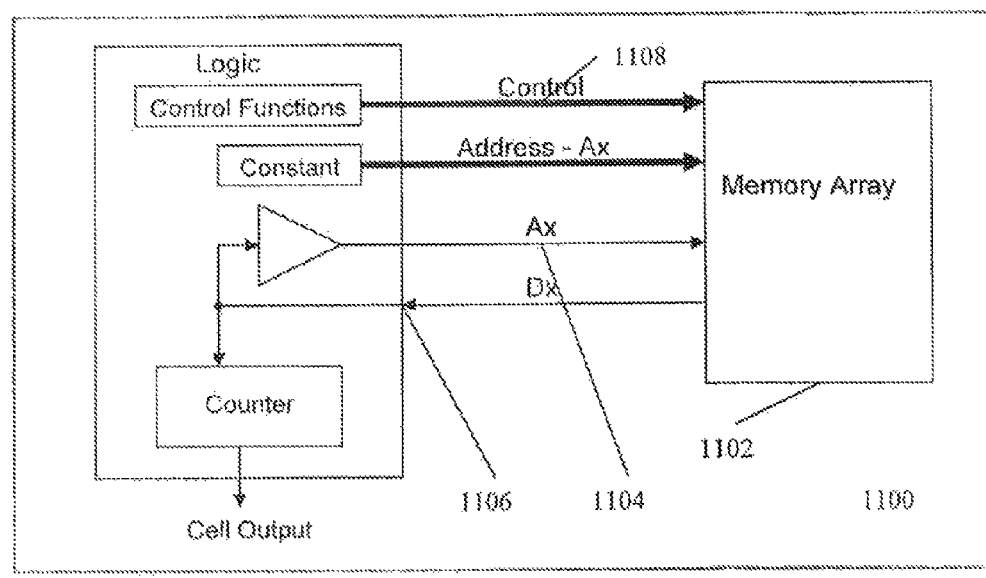
FIG. 17 discloses an AUF cell based on a memory array.

As discussed in U.S. Patent Application Publication No. 2011/0234241, entitled "METHOD AND SYSTEM FOR PROTECTING PRODUCTS AND TECHNOLOGY FROM INTEGRATED CIRCUITS WHICH HAVE BEEN SUBJECT TO TAMPERING, STRESSING AND REPLACEMENT AS WELL AS DETECTING INTEGRATED CIRCUITS THAT HAVE BEEN SUBJECT TO TAMPERING", which is incorporated herein, an oscillating system may be formed using digital memory devices and in combination with logic elements to produce an oscillating system. As discussed in that application and shown in FIG. 17, suitable data is stored in memory 1102 such that a specific address bit (Ax) 1104 and a specific data bit (Dx) 1106 have are the inverse of each other based on some condition of the remaining address bits (Address-Ax) 1108. Basically, a suitable AUF cell 1100 is produced based on a memory device.

Figure 18:
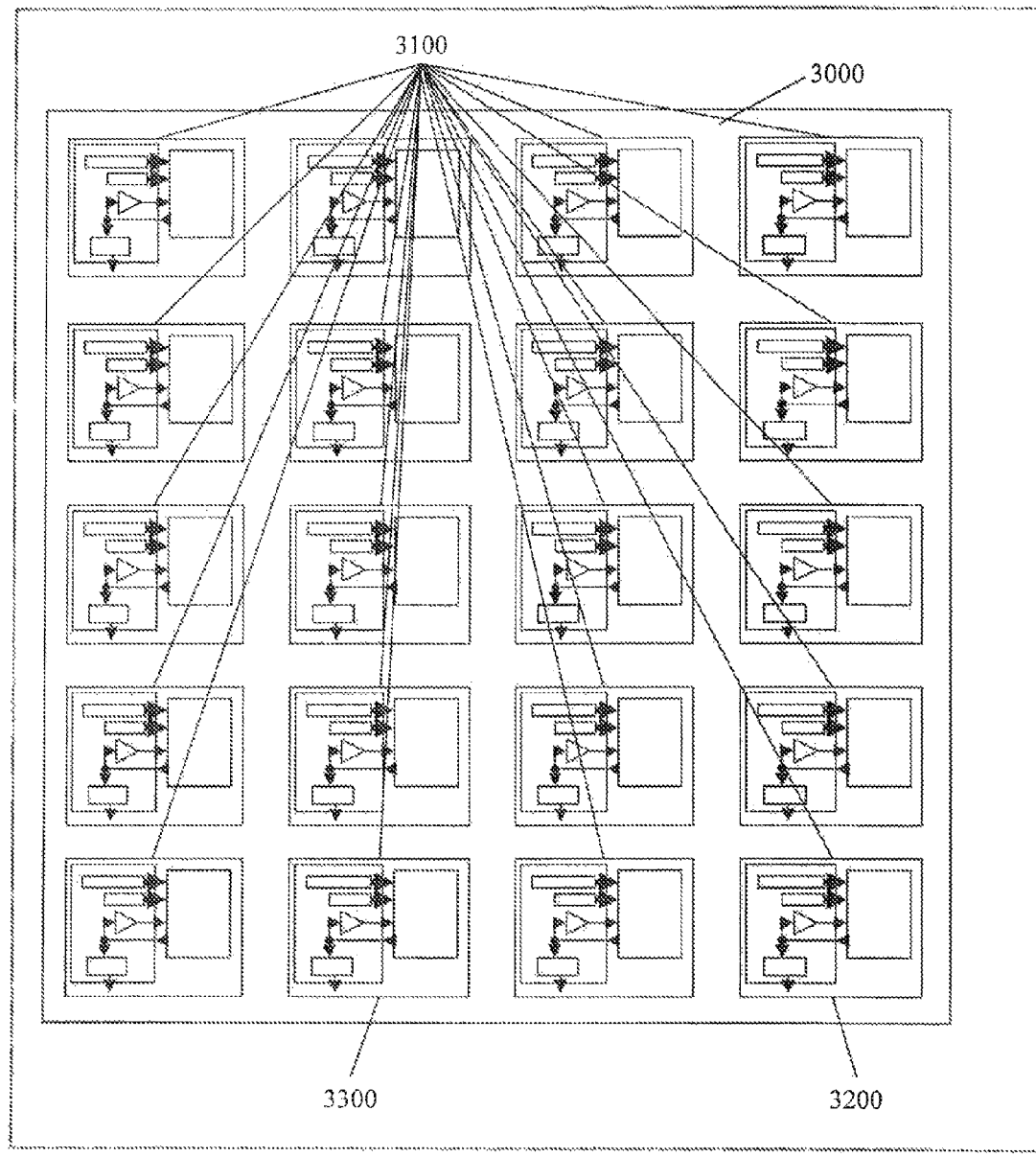
FIG. 18 discloses an AUF composed of memory based AUF cells.

Many modern FPGAs contain numerous internal memory arrays so that an AUF array 3000 could be composed of memory based AUF cells 3100, each with its own dedicated memory. As shown in FIG. 18, the memory based AUF array 3000 constructed of numerous memory based AUF cells 3100 would then be operated as described for the ring oscillator based and Arithmetic based AUF cells such that one or more cell 3200 would be dedicated as a reference cell for compensation purposes and one or more cells 3300 could be selected a minuend for result scaling.

These examples are not meant to limit the construction of an Asymmetric Unclonable Function, but to demonstrate that an AUF could be constructed from a wide variety of circuits including analog and digital circuitry. Any circuit that produces some type of delay may be used to construct an AUF cell.

Other AUF Possibilities

In traditional terms an electronic PUF has been constructed with multiple elements where the passage of a specific amount of time was a critical factor in the operation of the PUF. In an Arbiter PUF for example, the amount of time it takes for an electrical signal to propagate through each selected path gives the Arbiter PUF its variability. In an Asymmetric Unclonable Function (AUF), the amount of time allowed to pass is varied so that a specific element within the overall AUF structure reaches a predetermined set-point, such as a counter reaching a specific count value. In this example, time is a controlled variable, and the results of all other similar structures within the AUF are similarly affected by the single control variable (time), and their final results become the measured data. There are other implementations however where the control variable is not time but some other mechanism. Because AUFs are measuring differences in inherently similar things (such as counters counting over time, where the time variable is controlled by a reference counter), there are a wide variety of ways to implement an AUF. This section details just a few different kinds of implementation options to show the applicability of AUFs to a wide variety of applications.

Current Through a Resistor

Given an array of resistors and a common electrical current being applied to all of them, an AUF could be constructed whereby the measured voltage across one resistor becomes the reference voltage, and the measured voltage against every other resistor becomes the measurement data. In this example, the control variable is not time through a counter, but current through a resistor. In such an AUF structure, one resistor is chosen to be the reference by which the control variable is adjusted. The control variable in this example is the current applied to each of the resistors in the array. The reference is one of the resistors in the array. Which resistor becomes the reference is not important, and in fact which resistor is used as a reference can become a part of a challenge in a challenge/response style implementation. The natural minute manufacturing variances measured in this example are the very slight voltage fluctuations that occur in the transmission of current from the source to the input of each resistor, as well as the minute variations in the resistors themselves that cause a difference in the voltage generated across the resistor when a controlled current is applied to them. In this example the intentional similarities between each like structure is resistance to current. The individual resistors of the array may be of the same nominal resistance or may be different from one another.

Voltage Dividers

The example above may be adjusted slightly to a more common voltage source instead of a current source. Instead of adjusting current through an array of resistors until the voltage across a control, or reference, resistor reaches a set value, a common voltage can be applied to an array of voltage dividers (two resistors in series where the measurement point is the voltage at the connection point between the two resistors). The voltage applied to all voltage dividers can be adjusted until the voltage measured across one voltage divider, selected as the reference structure, reaches a specific value. The voltage across all other voltage dividers in the AUF is then measured and becomes the collected data.

Voltage Generated by Applying Light to Photo-Diodes

In an example of a photo-diode, the controlled variable is the amount of light applied to an array of photo-diodes, and the elements are photo diodes. The reference is the voltage generated by a particular photo-diode. The light is adjusted so that the voltage generated by the reference diode reaches a specific set-point. The voltage generated by all other diodes in the array becomes the measurement data.

Heat Transfer Through Metal Plates

In an example of thermal conductivity through metal plates, the elements being tested is heat conductivity through metal plates. In such an example, an array of metal plates may be suspended in a single plane perpendicular to a sufficiently large, constant, and uniform heat source. Any single plate may be selected as the reference, and the array of plates may be positioned closer to or farther from the heat source until the amount of heat conducted through the reference plate reaches a specific set-point. The amount of heat conducted through every other plate at that same position becomes the measurement data. This example requires a sufficiently long passage of time so that the thermal transfer measured at each element (including the reference) stabilizes.

Typical AUF Characteristics

Any system of elements may be used as an AUF implementation if the following conditions are met:

The system of elements are all like-kind, in that they respond to a stimulus in a known and repeatable fashion;

Any one element may be selected as a reference element;

Because the reference element is like-kind to all other elements in the array, any other natural and uncontrolled secondary stimulus applied to the elements are automatically and naturally compensated out of the measurement data when the controlled stimulus is adjusted to produce the desired set-point in the reference element;

The stimulus applied to the reference element is likewise applied to all other elements;

The response generated by the reference element can be adjusted by varying the stimulus;

The response generated by each element in the stimulus in reaction to the stimulus can be measured reliably and repeatedly. In other words, that the measurement technique does not introduce undesired variance;

The response of each element can be measured when the response by the reference element reaches a predetermined set-point when the applied stimulus is at a specific value;

The values collected from all of the elements in the array may then be gathered, compared, etc.

AUF Result Analysis

Figure 19:
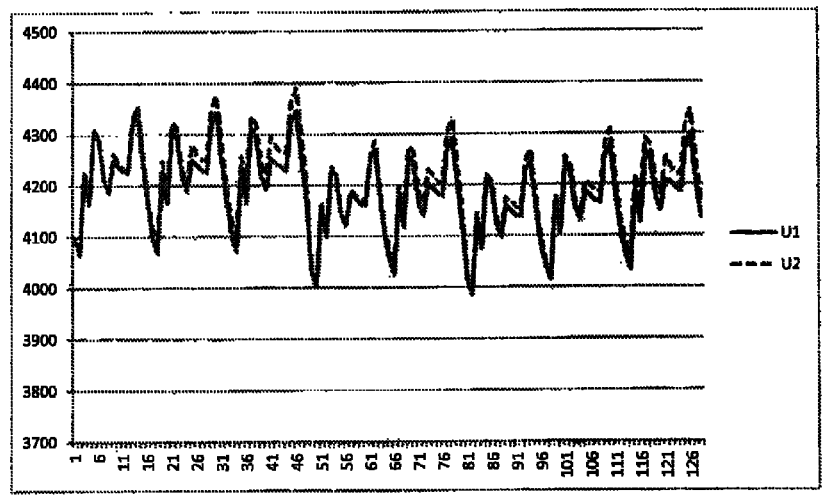
FIG. 19 shows the compensated result of an identical AUF implementation and identical challenge performed on 2 different integrated circuits.
Figure 20:
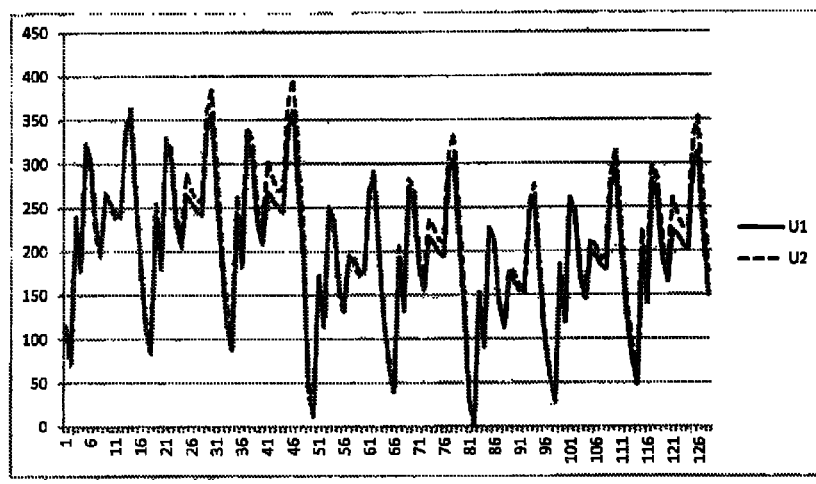
FIG. 20 shows the scaled results from FIG. 19.

In keeping with the present invention an AUF array is implemented in two identical ICs. The compensated results are shown in FIG. 19 where the x axis represents the cell number and the y axis represents the cell output (the value output by the binary counter at the end of the test period). FIG. 20 shows the results after scaling by subtracting the lowest value from all other values. (Normally the minuend is eliminated from the results since its value is always reduced to zero.) In this case, cell 82 had the lowest output value and remains in the scaled data for this example.

It is important that the results of the responses from the two ICs are similar. This similarity between the results is known as the family characteristic. The family characteristic confirms that the two ICs tested are actually of the same design. A device that is a clone will have design differences in internal resources such as multipliers, memory, logic elements, and routing resources that are detected by analysis of the family characteristics.

Figure 21:
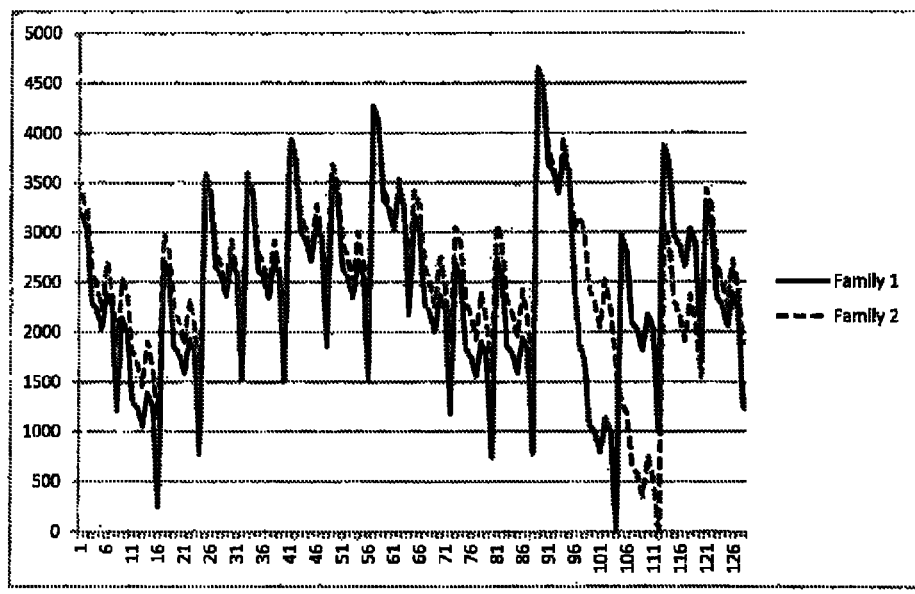
FIG. 21 shows a comparison of family characteristics.
Figure 22:
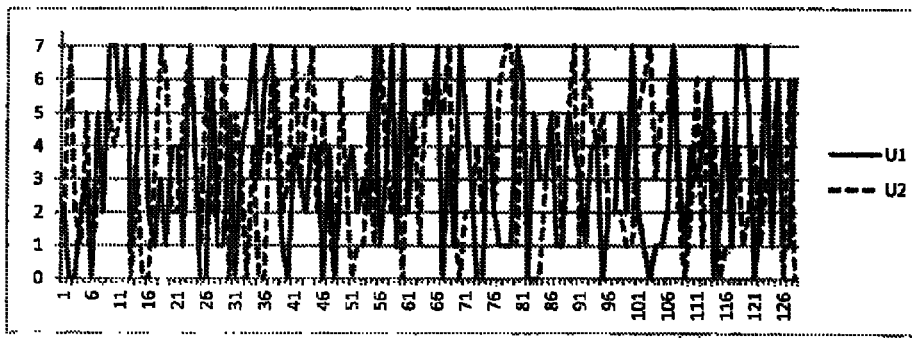
FIG. 22 shows cryptographic keys derived from the scaled data from FIG. 20.

FIG. 21 shows the comparison of AUF results from a memory based AUF using memory devices from different manufacturers. These family characteristics are the combined results of data from numerous devices. Comparing family's characteristics provides a powerful tool for differentiating ICs whether the families are defined by manufacturer, die revision, or some other attribute. Family characteristics identified by AUF circuits and techniques are useful for identification of counterfeit and modified electronics.

One of the most important advantages of AUF is that similarities between integrated circuit and systems may be identified. A traditional PUF with single bit outputs per cell can show that two integrated circuits are different but it cannot show what similarities exist between the devices. These similarity observations are a powerful tool for security and authentication purposes.

There are a number of methods available for deriving a unique key from AUF results data. The scaled data is useful for authentication, that is, to determine the unique identity of an integrated circuit. The integrated circuit may be tested and the scaled data stored in a database with similar values from other integrated circuits. When the integrated circuit is tested later for authentication purposes a process of comparing the scaled output values to those stored in the database yields an accurate assessment of the identity of the integrated circuit. The scaled output of each AUF cell is compared to the scaled output values for each cell in the database and the total error summed (the sum of the difference between the test integrated circuit cell values and the database cell values). The total error for an integrated circuit identity match is typically an order of magnitude lower than the error for the closest mismatch.

A cryptographic key may also be derived from the result data. The least significant bits are used to derive a cryptographic key. FIG. 21 shows keys derived from each integrated circuit by using only the 3 least significant bits of each scaled result value. This reduced result which only utilizes least significant bits provides dramatic improvements over traditional PUFs in Entropy, Variation, and Stability.

SUMMARY

In summary, the present invention provides an electronic AUF implemented with non-identical and non-symmetric (asymmetric) elements. The electronic AUF is composed of numerous non-identical asymmetric elements in order to construct structures that are not identical to each other. The present AUF produces compensated outputs of non-identical structures (as described above) that correct for the affects of temperature, voltage, and aging that may be are compared by subtraction, division, integration, or differentiation. The result of each comparison is a multi-bit value, or vector, instead of a single bit.

The AUF embodied by the present invention extend outside of (or beyond) the boundaries of the integrated circuit and the PUF structures may include analog components such as operational amplifiers. The present AUF system may include PUF structures composed of PCB traces, cable, and/or back planes and/or other electrical interconnection systems; PUF structures composed of optical transmitters and receivers; PUF structures composed of fiber optic transmitters, receivers and fiber optic cables; PUF structures composed of acoustic transmitters and receivers; and PUF structures composed of RF transmitters and Receivers and other RF elements.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An electronic system including an unclonable function for authentication of electronic devices and systems, comprising:

the electronic system implemented in integrated circuits;

a plurality of ring oscillator structures associated with the electronic system, each ring oscillator structure including a multiplexer, an inverter, groups of delay elements, a binary counter, and routing structures, each of the plurality of ring oscillator structures is of different construction comprising different delay elements, routing structures having different routing paths, or a combination of the different delay elements and routing structures, wherein the binary counter evaluates the multiplexer, inverter, delays elements and routing structures of the plurality of ring oscillator structures to provide an output such that variations based upon temperature or voltage are canceled and eliminated from the output; and a comparison unit to which output of each binary counter of the plurality of ring oscillator structures is routed wherein output of the comparison unit is a multi-bit value for each test that represents a magnitude of difference between the plurality of ring oscillator structures such that the multi-bit output value is applied in comparing integrated circuits to identify differences in the integrated circuits for authentication of electronics.

* * * * *